United States Patent
Singh et al.

(10) Patent No.: US 11,314,563 B1
(45) Date of Patent: Apr. 26, 2022

(54) CONTEXT-BASED GENERATION OF ACTIVITY FEED NOTIFICATIONS

(71) Applicant: Citrix Systems, Inc., Fort Lauderdale, FL (US)

(72) Inventors: Manbinder Pal Singh, Coral Springs, FL (US); Aikaterini Kalou, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/217,022

(22) Filed: Mar. 30, 2021

Related U.S. Application Data

(63) Continuation of application No. PCT/GR2021/000015, filed on Mar. 18, 2021.

(51) Int. Cl.
  *G06F 3/00* (2006.01)
  *G06F 9/54* (2006.01)

(52) U.S. Cl.
  CPC .............. *G06F 9/542* (2013.01); *G06F 9/541* (2013.01)

(58) Field of Classification Search
  CPC ........................................................ G06F 9/542
  See application file for complete search history.

(56) References Cited

U.S. PATENT DOCUMENTS

| | | | |
|---|---|---|---|
| 10,432,468 B2 | 10/2019 | Li et al. | |
| 2011/0252132 A1* | 10/2011 | Wetzer | G06F 9/542 709/224 |
| 2014/0179377 A1 | 6/2014 | Song et al. | |
| 2016/0253089 A1* | 9/2016 | Lee | H04M 19/04 345/173 |
| 2018/0181552 A1* | 6/2018 | Konnola | G06F 16/93 |
| 2020/0153920 A1 | 5/2020 | Chauhan | |
| 2020/0358784 A1* | 11/2020 | Khaund | H04L 63/105 |
| 2020/0374250 A1 | 11/2020 | Le Strat et al. | |
| 2021/0058339 A1 | 2/2021 | Zhang et al. | |
| 2021/0182171 A1* | 6/2021 | Qiao | G06F 11/3419 |
| 2021/0191790 A1* | 6/2021 | Gogate | H04L 67/10 |
| 2021/0294647 A1* | 9/2021 | Chu | G06N 20/00 |
| 2022/0004384 A1* | 1/2022 | White | H04L 41/50 |

FOREIGN PATENT DOCUMENTS

| | | | | |
|---|---|---|---|---|
| CA | 2409920 C | * | 5/2013 | ....... G06F 17/30566 |
| ES | 2646632 A2 | * | 12/2017 | ........... G06F 9/5005 |

OTHER PUBLICATIONS

Silas Boyd-Wickizer, Corey: An Operating System for Many Cores. (Year: 2000).*

Ruiz, Ana "Citrix Workspace Microapps Service", Citrix Product Documentation, retrieved Mar. 23, 2021, https://docs.citrix.com/en-us/tech-zone/learn/tech-briefs/workspace-microapps.html.

(Continued)

*Primary Examiner* — Lechi Truong
(74) *Attorney, Agent, or Firm* — Pierce Atwood LLP

(57) ABSTRACT

In some embodiments, a computing system may receive at least first data indicative of a first event of a first system of record accessed using first access credentials associated with a user, determine, based at least in part on first stored contextual data associated with the user, to create at least a first notification of the first event based at least in part on the first data, and send the first notification to a client device operated by the user.

20 Claims, 14 Drawing Sheets

(56) References Cited

OTHER PUBLICATIONS

"Semi Supervised Classification using AutoEncoders", kaggle, retrieved Mar. 23, 2021, kaggle.com/shivamb/semi-supervised-classification-using-autoencoders.

"Autoencoder", Wikipedia.com, retrieved Mar. 23, 2021, https://en.wikipedia.org/wiki/Autoencoder#:~:text=An%20autoencoder%20is%20a%20type,to%20ignore%20signal%20%E2%80%9Cnoise%E2%80%9D.

"Reinforcement learning", Wikipedia.com, retrieved Mar. 23, 2021, https://en.wikipedia.org/wiki/Reinforcement_learning#:~:text=Reinforcement%20learning%20(RL)%20is%20an,supervised%20learning%20and%20unsupervised%20learning.

Corno, et al. "A Context and User Aware Smart Notification System", The 2015 IEEE 2nd World Forum on Internet of Things, Dec. 2015, DOI:10.1109/WF-IoT.2015.7389130.

U.S. Appl. No. 17/022,570, filed Sep. 16, 2020.

International Search Report and Written Opinion dated Dec. 9, 2021 for International Patent Application No. PCT/GR2021/000015.

\* cited by examiner

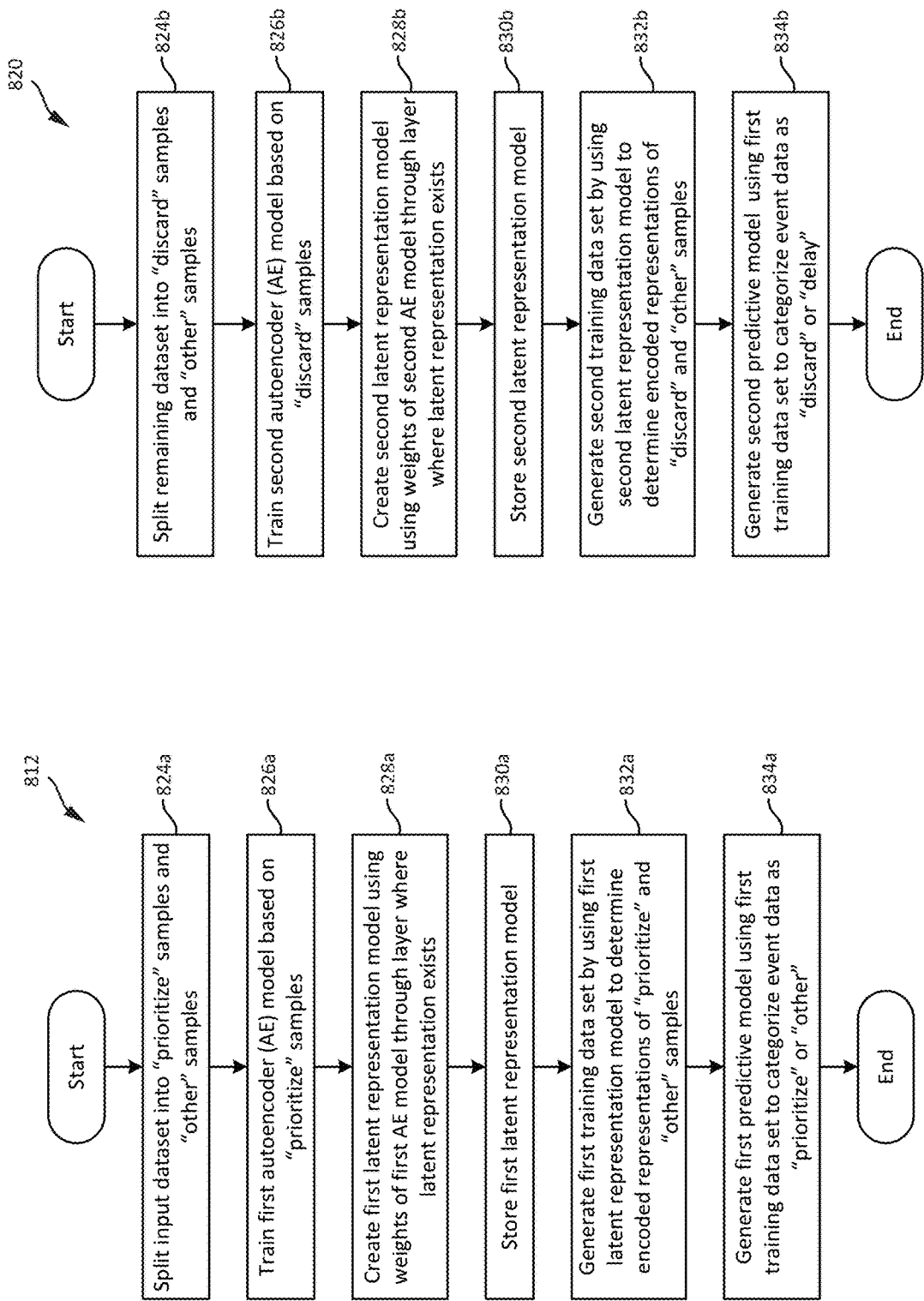

US 11,314,563 B1

CONTEXT-BASED GENERATION OF ACTIVITY FEED NOTIFICATIONS

CROSS-REFERENCE TO RELATED APPLICATIONS

This application is a continuation of and claims the benefit under 35 U.S.C. § 120 and 35 U.S.C. § 365(c) to International Application PCT/GR2021/000015, entitled CONTEXT-BASED GENERATION OF ACTIVITY FEED NOTIFICATIONS, with an international filing date of Mar. 18, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by a computing system, at least first data indicative of a first event of a first system of record accessed using first access credentials associated with a user; determining, by the computing system and based at least in part on first stored contextual data associated with the user, to create at least a first notification of the first event based at least in part on the first data; and sending, by the computing system, the first notification to a client device operated by the user.

In some embodiments, a computing system, comprises at least one processor, and at least one computer-readable medium encoded with instructions which, when executed by the at least one processor, cause the computing system to receive at least first data indicative of a first event of a first system of record accessed using first access credentials associated with a user, to determine, based at least in part on first stored contextual data associated with the user, to create at least a first notification of the first event based at least in part on the first data, and to send the first notification to a client device operated by the user.

In some embodiments, at least one non-transitory computer-readable medium is encoded with instructions which, when executed by at least one processor of a computing system, cause the computing system to receive at least first data indicative of a first event of a first system of record accessed using first access credentials associated with a user, to determine, based at least in part on first stored contextual data associated with the user, to create at least a first notification of the first event based at least in part on the first data, and to send the first notification to a client device operated by the user.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 8B shows an example implementation of one of the steps of the routine shown in FIG. 8A;

FIG. 8C shows an example implementation of another of the steps of the routine shown in FIG. 8A;

DETAILED DESCRIPTION

Figure 1:
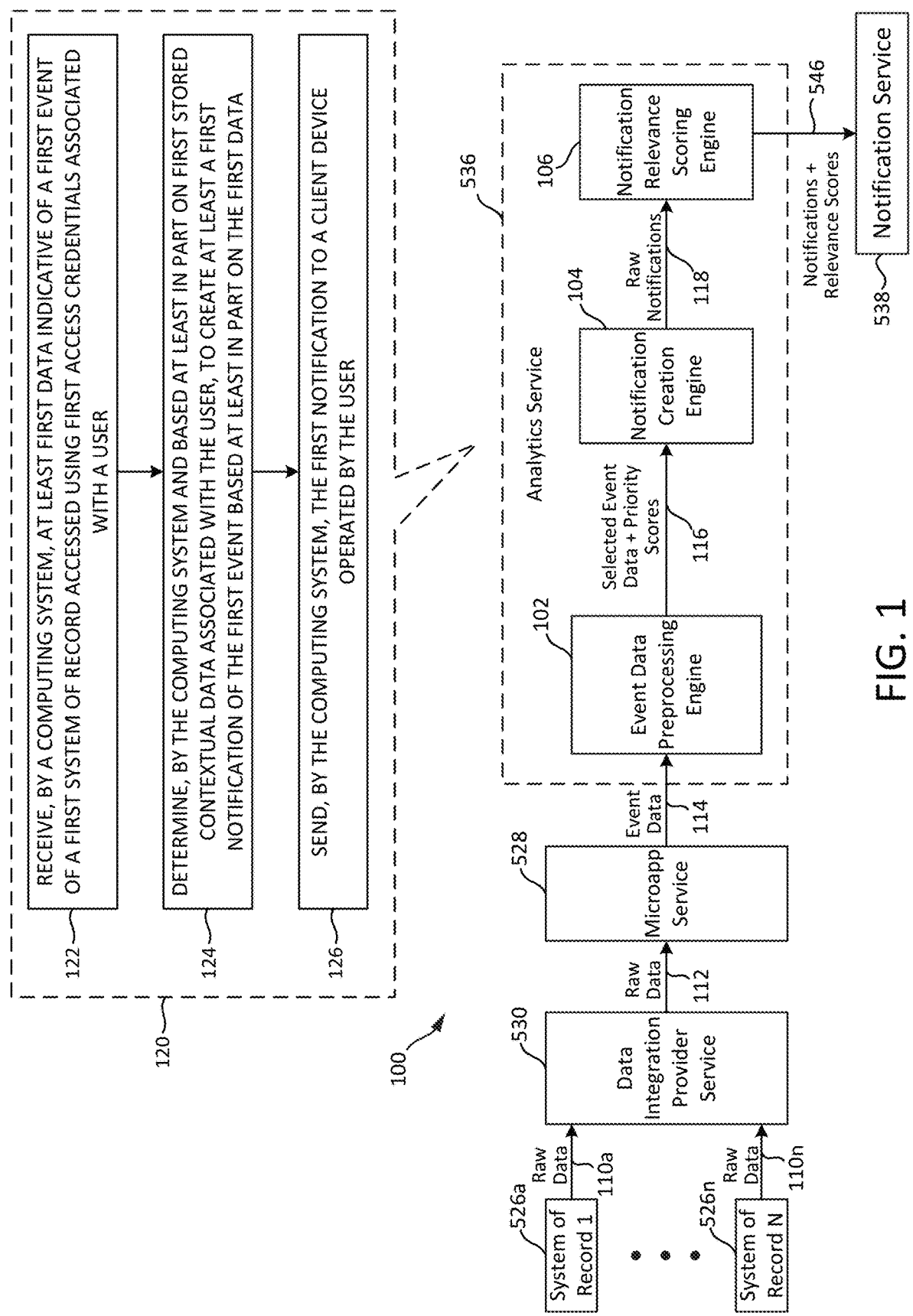
FIG. 1 is a block diagram of an example system configured to generate activity feed notifications based on contextual data in accordance with some embodiments of the present disclosure.

For purposes of reading the description of the various embodiments below, the following descriptions of the sections of the specification and their respective contents may be helpful:

Section A provides an introduction to example embodiments of a system for generating activity feed notifications based on contextual data;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system for generating activity feed notifications based on contextual data that was introduced in Section A; and Section G describes example implementations of methods, systems/devices, and computer-readable media in accordance with the present disclosure.

A. Introduction to Illustrative Embodiments of Systems for Generating Activity Feed Notifications Based on Contextual Data An intelligent activity feed, such as that offered by the Citrix Workspace™ family of products, provides significant benefits, as it allows a user to respond to application-specific events generated by disparate systems of record, without requiring the user to switch context and separately launch the respective applications to take actions with respect to the different events. An example of a system capable of providing such an activity feed is described in Section E below in connection with FIGS. 5A-D. In such a system, a remote computing system may be responsible for monitoring and interacting with various systems of record (e.g., SaaS applications, web applications, Windows applications, Linux applications, desktops, file repositories and/or file sharing systems, etc.) on behalf of a user operating a client device. As Section E describes (in connection with FIGS. 5C and 5D), a user 524 may operate a client device 202 so as to interact with "microapps" corresponding to particular functionalities of a variety of systems of record 526, and such microapps may, in turn, interact with the systems of record 526, e.g., via application programming interfaces (APIs) of such systems, on behalf of the user 524.

More specifically, and as described in more detail in Section E, a microapp service 528 (shown in FIG. 5C) may periodically request a sync with a data integration provider service 530, so as to cause active data to be pulled from the systems of record 526. In some implementations, for example, the microapp service 528 may retrieve encrypted service account credentials for the systems of record 526 from a credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to an analytics service 536 for processing. The analytics service 536 may create notifications (e.g., targeted scored notifications) and send such notifications to the notification service 538. The notification service 538 may store the notifications in a database to be later served in an activity feed and/or may send the notifications out immediately to the client 202 as a push notification to the user 524.

Figure 5A:
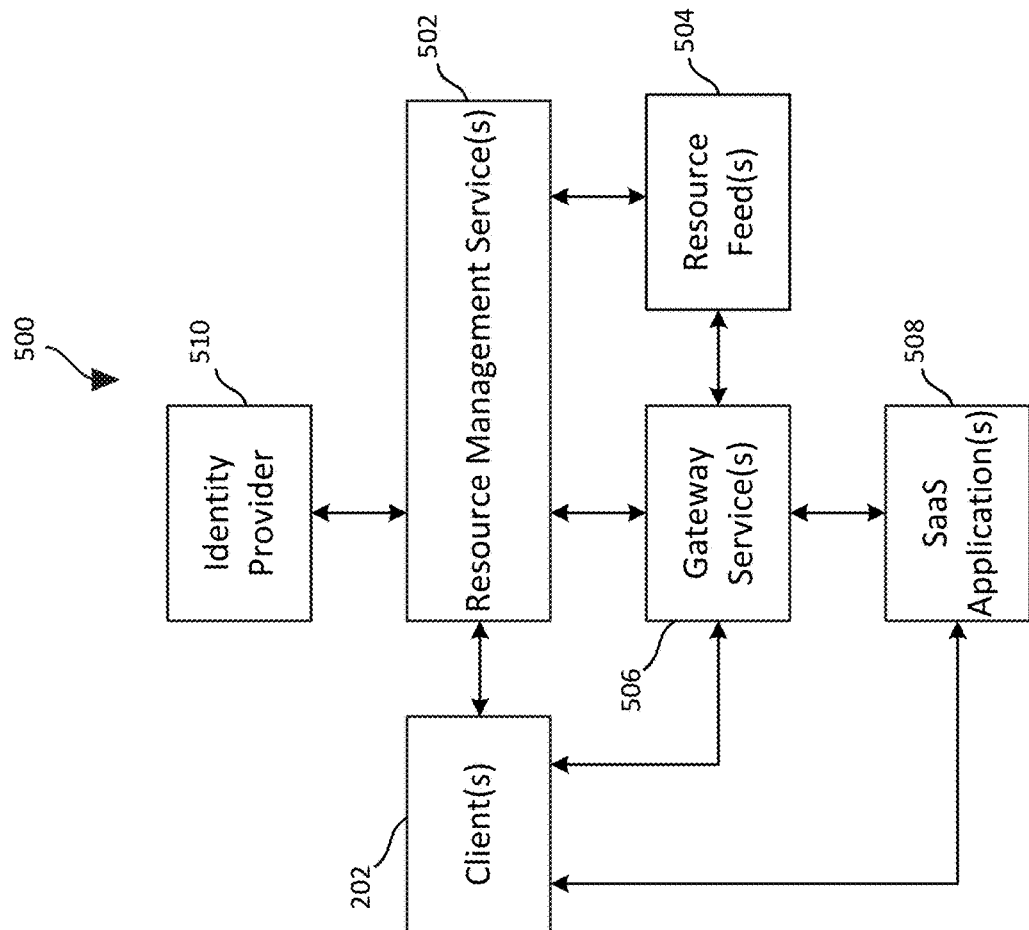
FIG. 5A is a block diagram of an example system in which resource management services may manage and streamline access by clients to resource feeds (via one or more gateway services) and/or software-as-a-service (SaaS) applications.
Figure 5B:
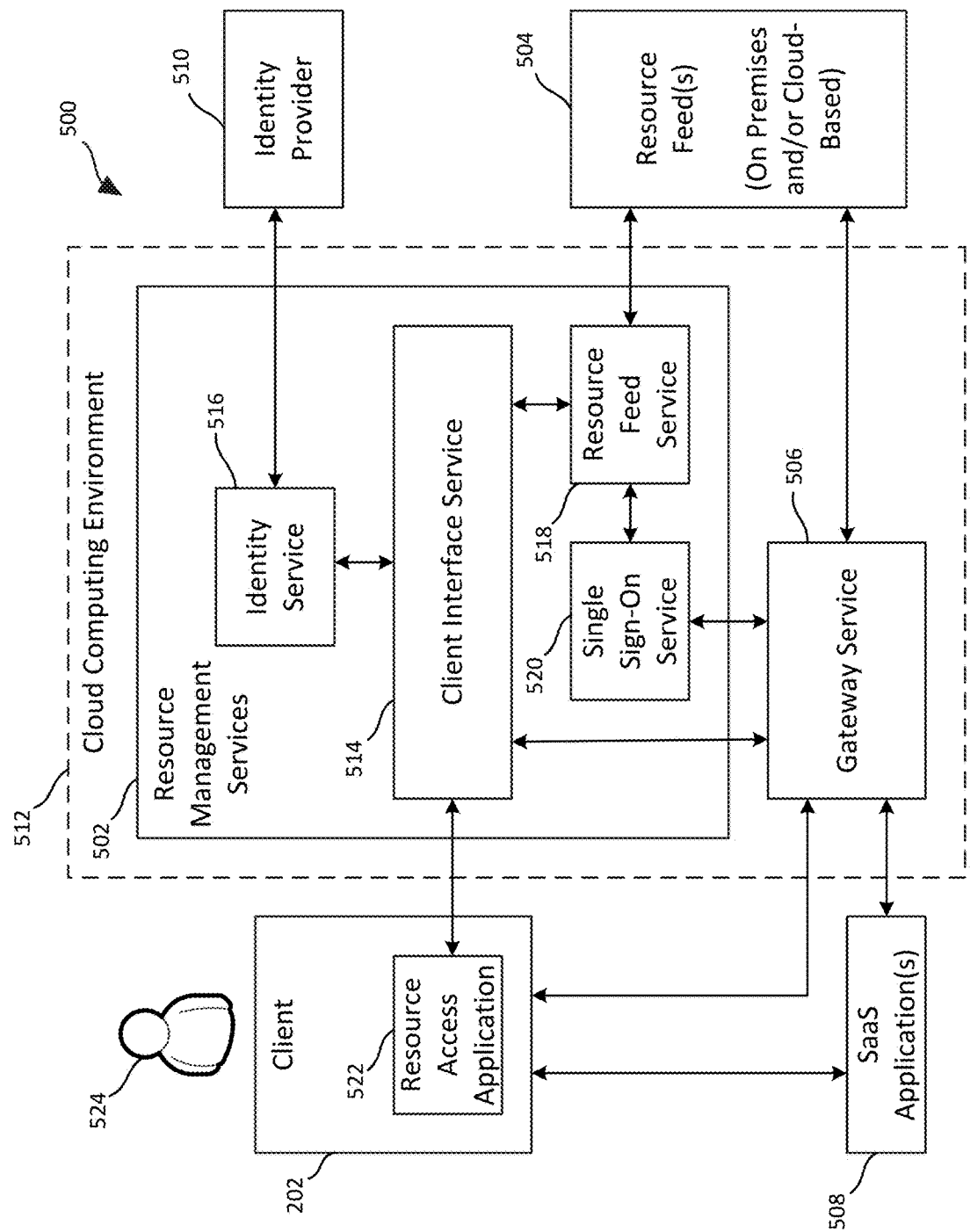
FIG. 5B is a block diagram showing an example implementation of the system shown in FIG. 5A in which various resource management services as well as a gateway service are located within a cloud computing environment.
Figure 5C:
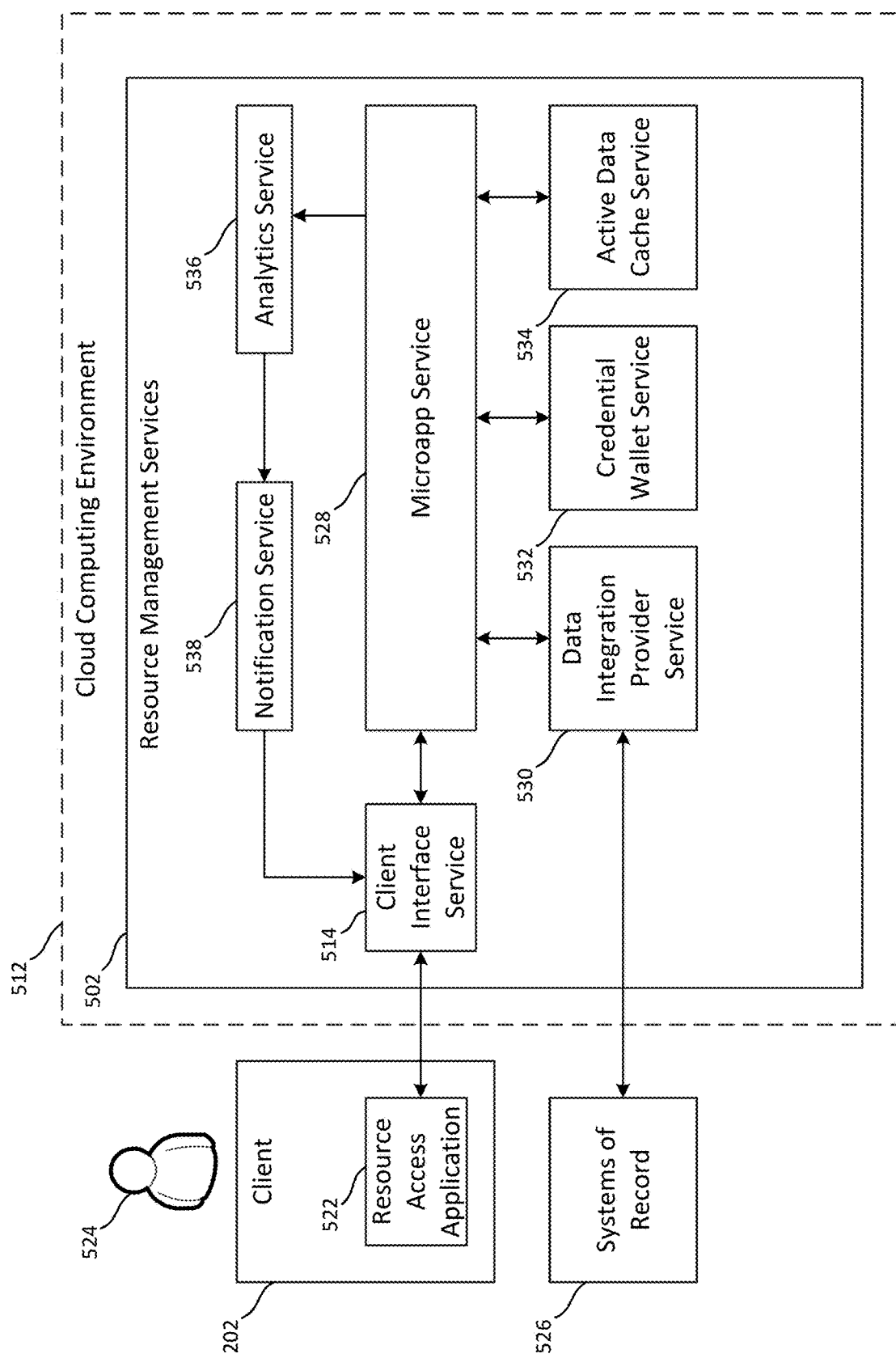
FIG. 5C is a block diagram similar to that shown in FIG. 5B but in which the available resources are represented by a single box labeled "systems of record," and further in which several different services are included among the resource management services.
Figure 5D:
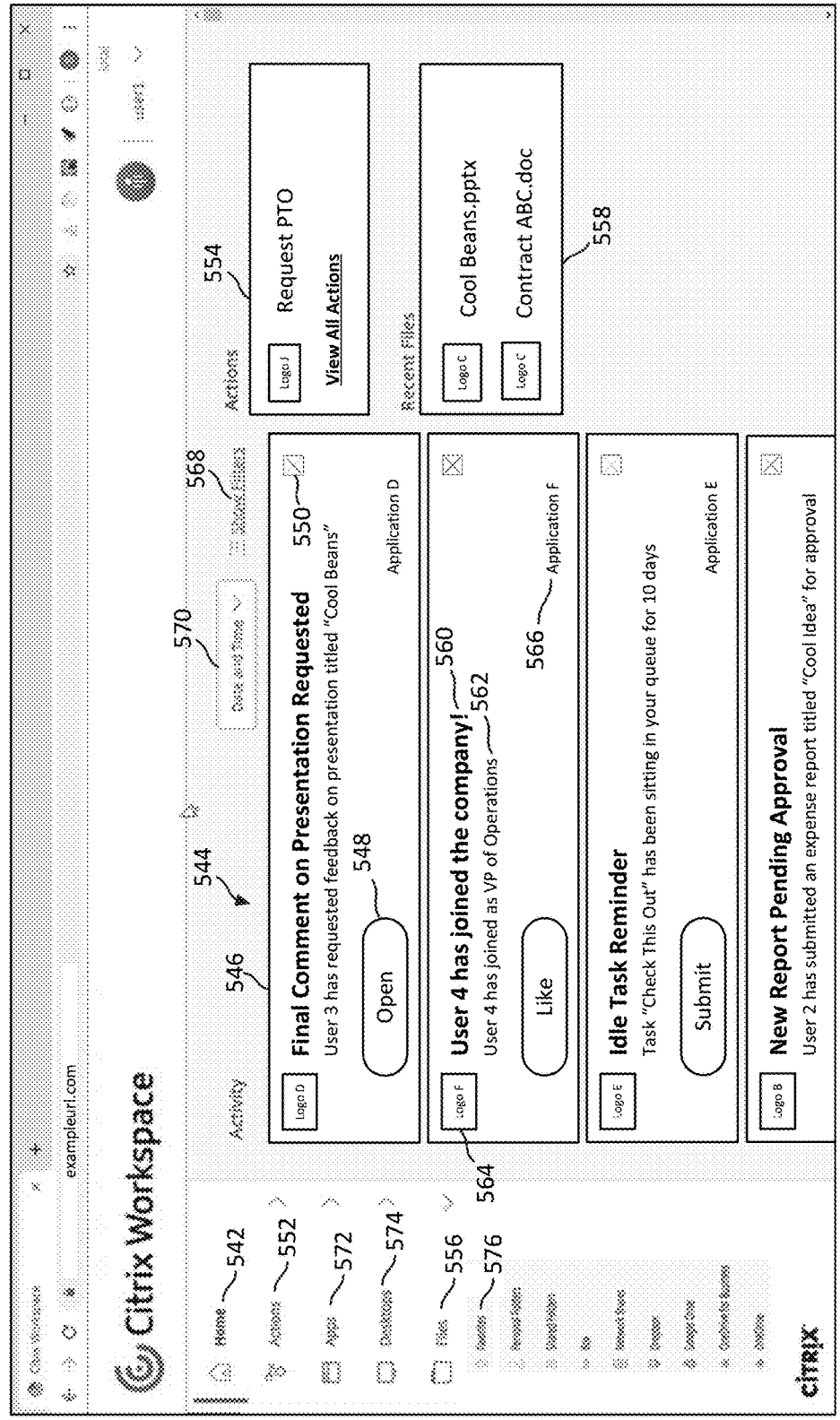
FIG. 5D shows how a display screen may appear when an intelligent activity feed feature of a multi-resource management system, such as that shown in FIG. 5C, is employed.

FIG. 5D, which is also described in more detail in Section E, shows how a display screen 540 presented by a resource access application 522 (shown in FIG. 5C) may appear when an intelligent activity feed feature is employed and a user 524 is logged on to the system. As shown in FIG. 5D, an activity feed 544 may be presented on the display screen 540 that includes a plurality of notifications 546 about respective events that occurred within various applications to which the user 524 has access rights.

The inventors have recognized and appreciated that, particularly for large scale deployments in which very large numbers of notifications 546 need to be delivered to client devices 202, the in-depth processing of raw events that is employed by the analytics service 536 to generate the targeted scored notifications 546 it sends to the notification service 538 may create a bottleneck in the notification creation/delivery pipeline. If left unaddressed, such a bottleneck can result in the delay in the delivery of at least some notifications 546 to users 524, and may thus result in a poor experience by some users 524. Although this issue can be ameliorated to at least some extent by scaling the resources used for notification generation within the analytics service 536 to meet anticipated periods of increased demand, such a solution necessarily requires the deployment of additional computing resources and consequently adds to the complexity and expense of the system.

Offered is a system in which event data, such as the raw events the analytics service 536 receives from the microapp service 528 (as described below in connection 5C) may be preprocessed to improve and streamline the ability of the analytics service 536 to generate notifications 546 in a timely and meaningful manner. In some implementations, for example, such preprocessing may involve (A) discarding some event data (e.g., raw events that would result in the generation of notifications 546 with which a particular user 524 is unlikely to interact), (B) identifying event data that can be temporarily held for future processing (e.g., raw events that would result in the generation of notifications 546 that may be of interest to a particular user 524 but that such user 524 is unlikely to interact with in the short term), and/or (C) identifying event data for which notifications 546 are to be generated as soon as possible (e.g., raw events that would result in the generation of notifications 546 that a particular user 524 is likely to interact with in the short term). By performing one or more of such preprocessing steps, rather than having the analytics service 536 process all event data on a first-come-first-served basis to generate notifications 546, the burden on the notification generation components of the analytics service 536 can be reduced, and the ability of the analytics service 536 to generate important notifications 546 in a timely manner can be enhanced.

FIG. 1 shows an example implementation of a system 100 that is capable of creating targeted scored notifications 546 (similar to the components of the resource management services 502 shown in FIG. 5C), and that additionally includes an event data preprocessing engine 102 that may be configured to preprocess event data (e.g., raw events) received from the microapp service 528. As illustrated, in some implementations, the event data preprocessing engine 102 may be included within the analytics service 536 (also shown in FIG. 5C), together with a notification creation engine 104 and a notification relevance scoring engine 106.

The data integration provider service 530, the microapp service 528, and the notification service 538 may operate as described in below in connection with FIG. 5C. In particular, as indicated by arrows 110a-110n in FIG. 1, the data integration provider service 530 may retrieve raw data from respective systems of record 526a-526n and, as indicated by an arrow 112, may pass that raw data to the microapp service 528. The microapp service 528 may then identify notification-worthy events within the raw data and, as indicated by an arrow 114, pass event data relating to such events to the analytics service 536, and the analytics service 536 may process that event data to create targeted scored notifications 546 which may be passed to the notification service 538 for delivery to one or more client devices 202 (not shown in FIG. 1).

As described in more detail below, the event data preprocessing engine 102 may evaluate the event data it receives from the microapp service 528 in view of one or more pieces of stored contextual data to optimize the manner in which the notification creation engine 104 and the notification relevance scoring engine 106 together create targeted scored notifications 546 based on such event data. In some implementations, one or more trained machine learning (ML) models may be used for this purpose. Examples of contextual data that may be evaluated by such ML models, as well example processes that may be employed to train suitable ML models, are described in detail in Section F below.

In some implementations, the event data preprocessing engine 102 may determine, e.g., using one or more trained ML models, that certain event data is likely to result in the creation of notifications 546 that will not be useful for, or will not be of interest to, a particular user 524. The event data preprocessing engine 102 may thus determine to discard that event data, rather than passing it along to the notification creation engine 104.

Further, the event data preprocessing engine 102 may select, e.g., using one or more trained ML models, certain event data that is to be passed immediately to the notification creation engine 104 for processing. In some implementations, the event data preprocessing engine 102 may additionally or alternatively calculate or otherwise determine "priority scores" for respective instances of event data. Such priority scores may, for example, be calculated so as to be indicative of a relative urgency or importance of the respective events indicated by the event data. Example techniques for calculating such priority scores are described in detail in Section F below. As indicated by an arrow 116 in FIG. 1, the event data preprocessing engine 102 may pass the selected event data and assigned priority scores to the notification creation engine 104. In such implementations, the notification creation engine 104 may use the assigned priority scores to determine an optimal order in which to create notifications, e.g., by processing event data with higher priority scores prior to processing event data with lower priority scores.

As shown in FIG. 1, the notification creation engine 104 may generate raw notifications, i.e., notifications that have not yet been assigned relevance scores, and, as indicated by an arrow 118, may send the generated raw notifications to the notification relevance scoring engine 106. The notification scoring relevance scoring engine 106 may then evaluate the raw notifications, e.g., using one or more trained ML models, to determine relevance scores for them. The relevance scores may, for example, represent a predicted degree of relevance to the user 524 to whom the notification 546 is to be sent. As illustrated, the notification relevance scoring engine 106 may then send the targeted scored notifications 546 to the notification service 538 for delivery to one or more client devices 202.

In some implementations, the event data preprocessing engine 102 may additionally or alternatively determine, e.g., using one or more trained ML models, to temporarily refrain from sending certain event data to the notification creation engine 104. The event data preprocessing engine 102 may, for example, determine that such event data, although relating to an event that would likely be of interest to a particular user 524 at some point in the future, is unlikely to result in the generation of a notification 546 with which the user 524 will interact in the near term. In some implementations, for event data that is temporarily held by the event data preprocessing engine 102 in this manner, the event data preprocessing engine 102 may, e.g., using one or more trained ML models, determine an optimal time to subsequently send the delayed event data to the notification creation engine 104, together with a generation priority score, as discussed above. Examples of suitable ML models that may be used for this purpose are described in detail below in Section F in connection with FIG. 10.

FIG. 1 further shows an example routine 120 that may be performed by a combination of the analytics service 536 and the notification service 538 shown in FIG. 1 (collectively, a "computing system") in accordance with some embodiments of the present disclosure.

As shown, at a step 122 of the routine 120, the computing system (e.g., the event data preprocessing engine 102) may receive, e.g., as indicated by the arrow 114, at least first data indicative of a first event of a first system of record (e.g., the system of record 526a) accessed using first access credentials associated with a user.

At a step 124 of the routine 120, the computing system (e.g., the event data preprocessing engine 102) may determine, based at least in part on first stored contextual data associated with the user, to create (e.g., using the notification creation engine 104 and the notification relevance scoring engine 106) at least a first notification of the first event based at least in part on the first data.

As a step 126 of the routine 120, the computing system (e.g., the notification service 538) may send the first notification to a client device operated by the user.

Additional details and example implementations of embodiments of the present disclosure are set forth below in Section F, following a description of example systems and network environments in which such embodiments may be deployed.

B. Network Environment

Figure 2:
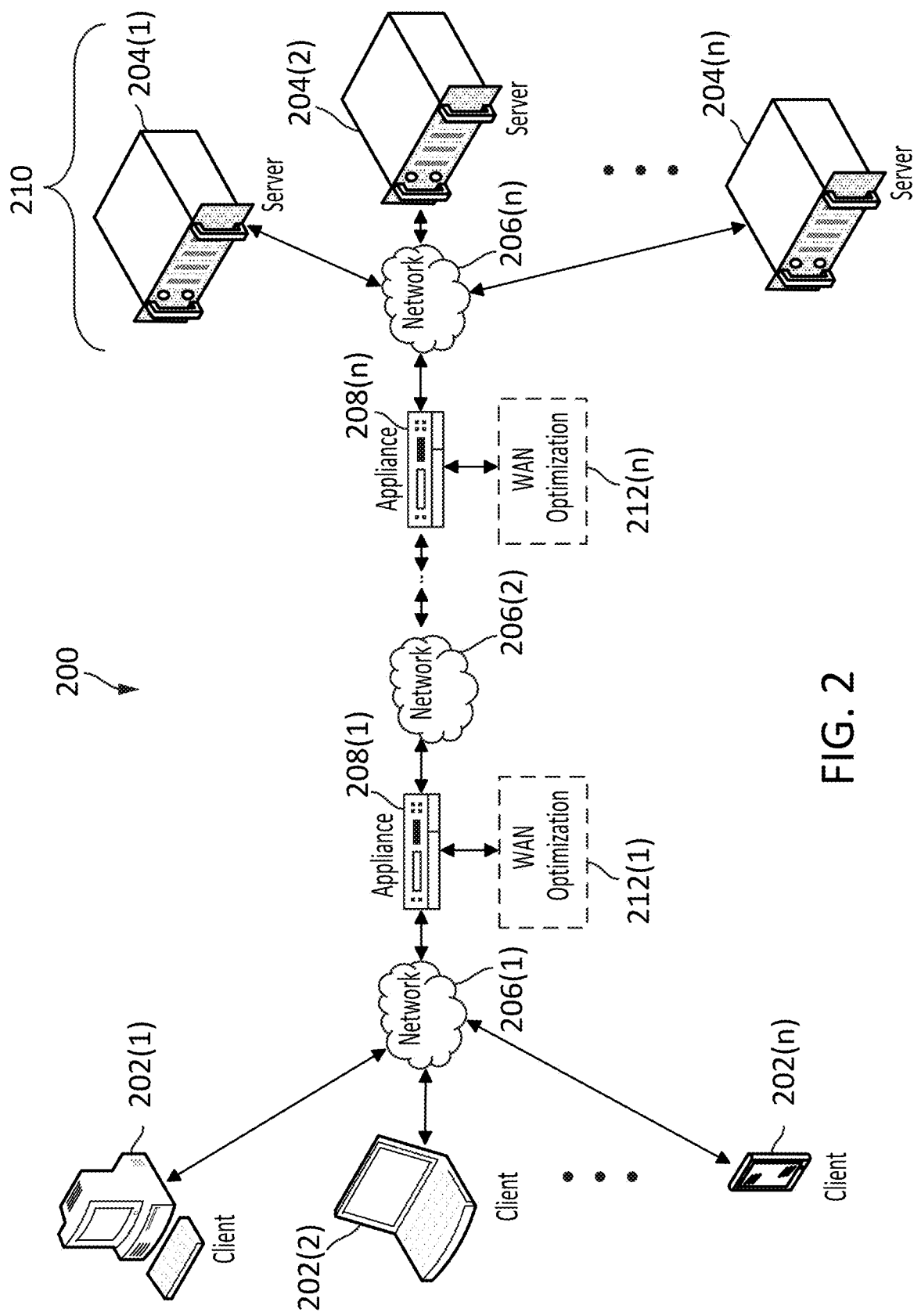
FIG. 2 is a diagram of a network environment in which some embodiments of the user customizable activity feed generation system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
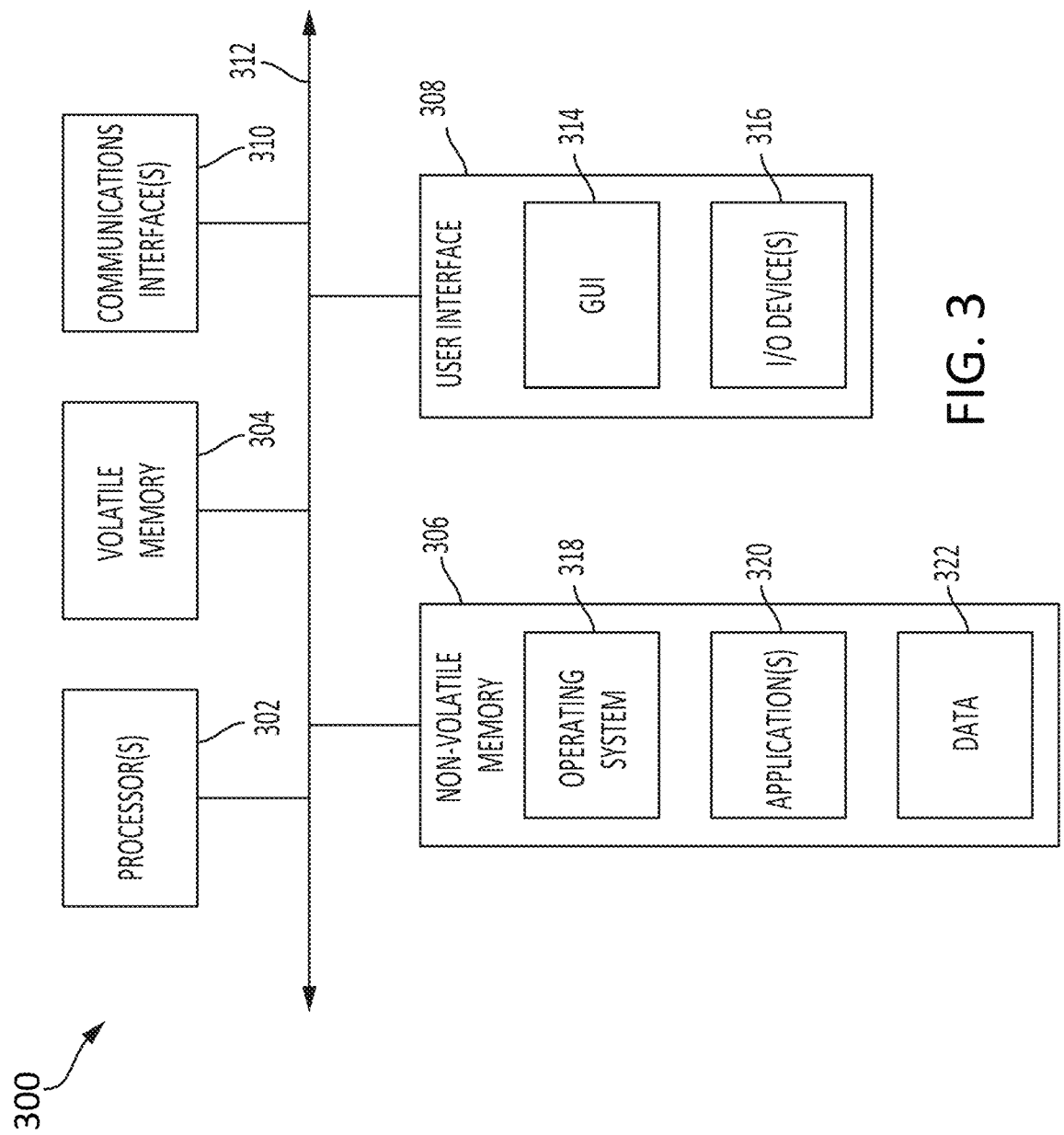
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
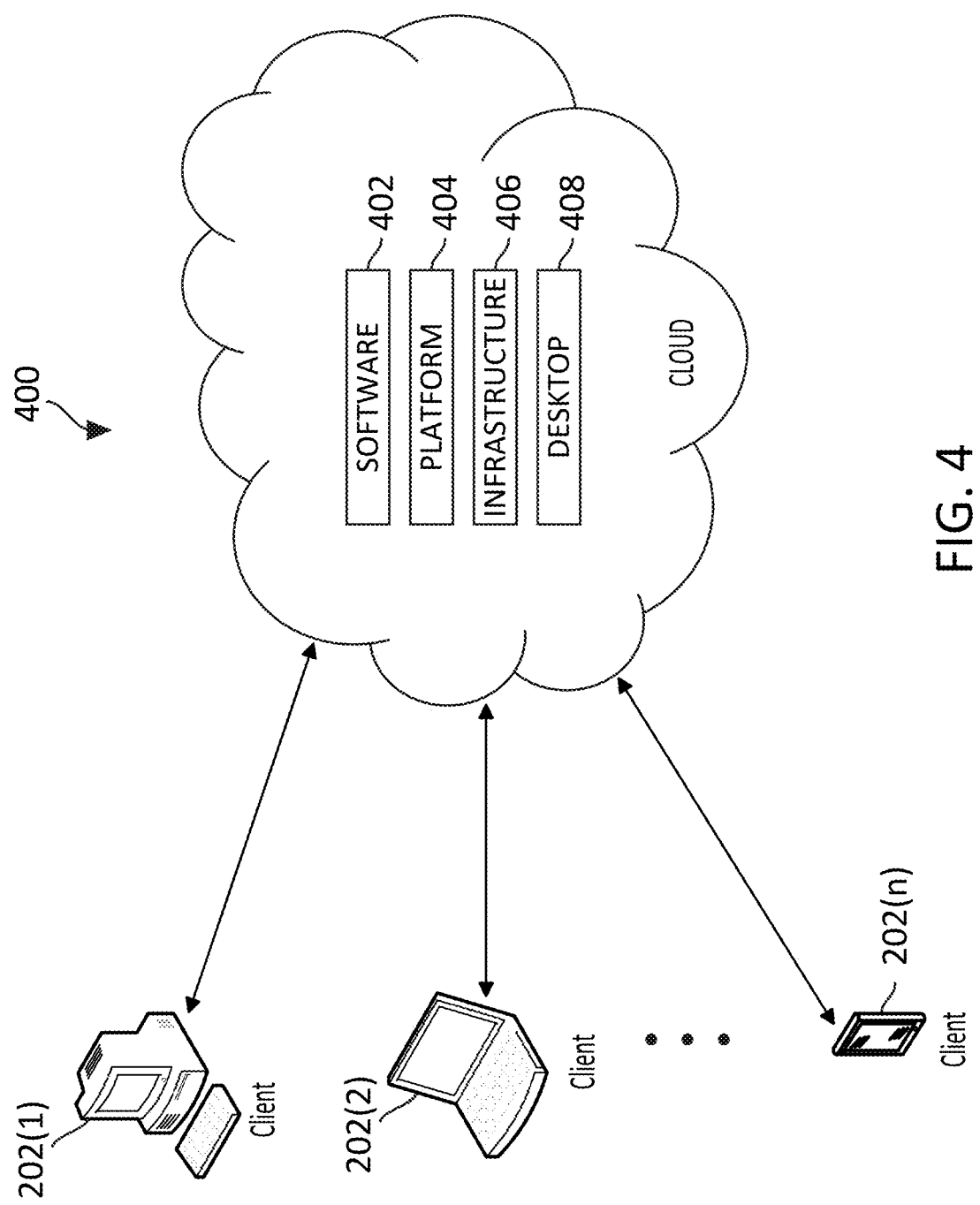
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of the Systems for Generating Activity Feed Notifications Based on Contextual Data Introduced in Section A As described above (in Section A) with reference to FIG. 1, in accordance with some implementations of the present disclosure, an event data preprocessing engine 102 may be introduced into an event notification creation/delivery pipeline (such as that described in connection with FIG. 5C) to optimize the manner in which targeted scored notifications 546 are created based on event data that may be received, for example, from the microapp service 528. As noted, the event data preprocessing engine 102 may evaluate the received event data (e.g., as indicated by the arrow 114 in FIG. 1) in view of one or more pieces of user specific contextual data to determine whether and/or when the received event data is to be passed to the notification creation engine 104 (at which it may be processed to generate raw notifications, i.e., notifications that have not yet been assigned relevance scores). As also described above, in some implementations, the notification creation engine 104 may, as indicated by the arrow 118, pass such raw notifications to the notification relevance scoring engine 106, which may assign relevance scores to the raw notifications to create targeted scored notifications 546. The resulting targeted scored notifications 546 may then be passed to a notification service 538 for delivery to one or more client devices 202 (e.g., as described in connection with FIG. 5C).

Figure 6:
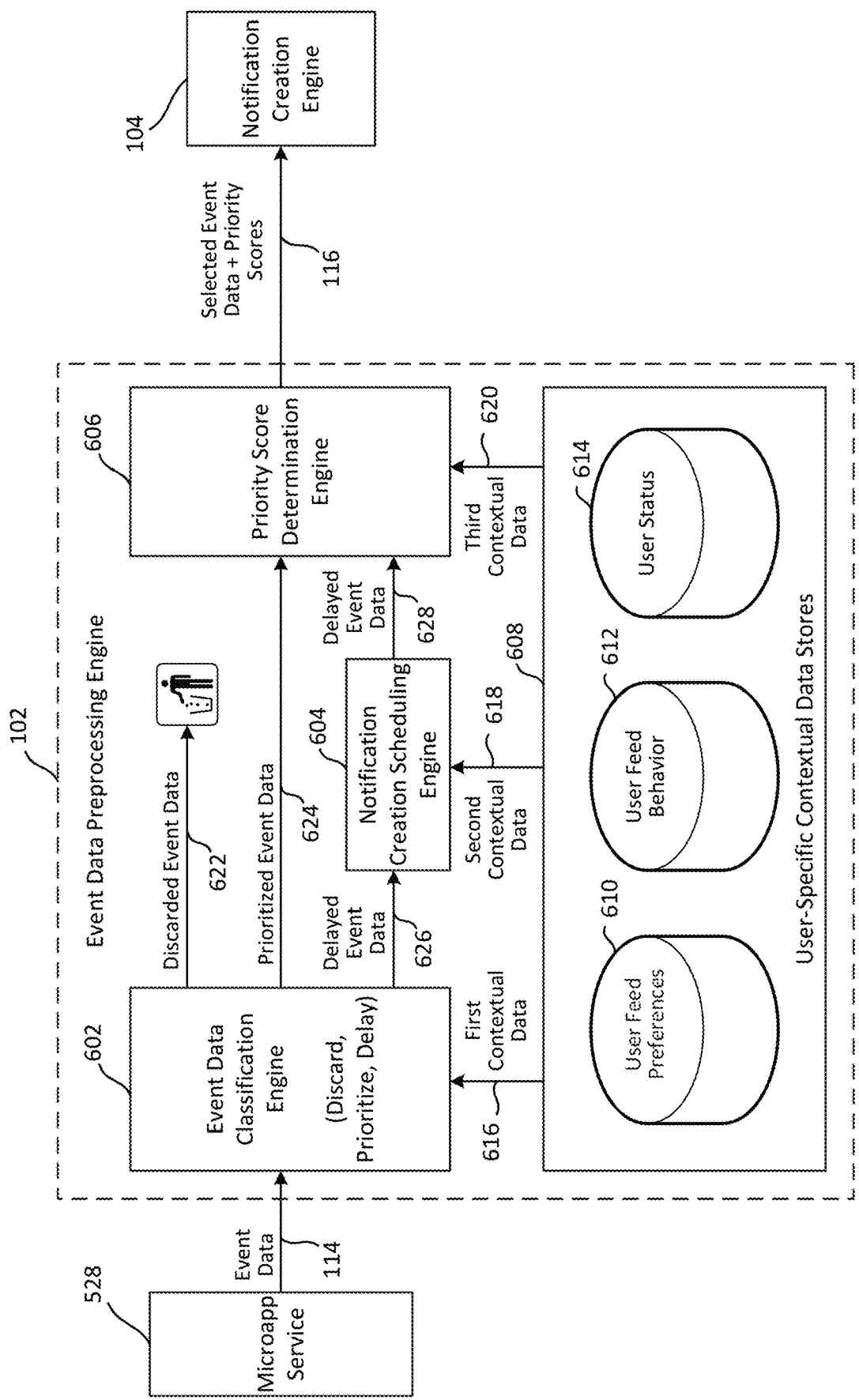
FIG. 6 shows additional details of the event data preprocessing engine shown in FIG. 1.

FIG. 6 shows an example embodiment of the event data preprocessing engine 102 shown in FIG. 1. As shown, in some implementations, the event data preprocessing engine 102 may include an event data classification engine 602, a notification creation scheduling engine 604, a priority score determination engine 606, and one or more user-specific contextual data stores 608. In the illustrated example, the user-specific contextual data stores 608 include a "user feed preferences" data store 610, a "user feed behavior" data store 612, and a "user status" data store 614. Examples of user-specific contextual data that may be included in the data stores 610, 612, 614 and referenced by the event data classification engine 602, the notification creation scheduling engine 604, and the priority score determination engine 606 (as "first contextual data," "second contextual data," and "third contextual data," as indicated by arrows 616, 618, 620, respectively) are described further below.

As shown in FIG. 6, the event data classification engine 602 may, as indicated by the arrow 114, receive event data from the microapp service 528, as was described above in connection with FIG. 1. The event data may, for example, include individual sets of data corresponding to respective events of the systems of record 526 for which the microapp service 528 has determined to generate notifications 546. The data set for a given event may include raw data received from one of the systems of record 526, and may also include metadata determined by the microapp service 528 based on such raw data and/or the system of record from which the raw data originated. Such metadata may, for example, indicate one or more features of the raw data, one or more features of the event the microapp service 528 detected within the raw data, and/or one or more features of the system of record 526 for which the event was detected.

As also shown in FIG. 6, the event data classification engine 602 may additionally receive first contextual data (as indicated by the arrow 616) from one or more of the contextual data stores 610, 612, 614. In some implementations, based on the event data and the first contextual data, the event data classification engine 602 may classify the event data for respective events into one of three categories:

(1) "discard," (2) "prioritize," and (3) "delay." Such a classification may, for example, be achieved using one or more trained ML models of the event data classification engine 602. For example, in some implementations, for respective events, at least a portion of the event data and at least a portion of the first contextual data may be encoded into a feature vector consumable by a trained ML model, and the trained ML model may process such feature vector to classify the event data under consideration into one of the three categories noted above. An example process for training one or more suitable ML models to perform such a three-way classification is described below in connection with FIGS. 8A-C and 9.

As indicated by an arrow 622 in FIG. 6, instances of event data that are classified (e.g., via a trained ML model of the event data classification engine 602) as "discard" may be deleted or ignored without being further processed by the event data preprocessing engine 102. For example, the event data classification engine 602 may determine to classify at least certain types of event data as "discard" when (A) the event data relates to an event a user has elected not to receive notifications for (e.g., if the first contextual data from the "user feed preferences" data store 610 indicates a user preference not to receive notifications for a particular type of event, such as security blog posts), (B) the event data would result in the generation of a notification 546 that a user is unlikely to interact with (e.g., if the first contextual data from the "user feed behavior" data store 612 indicates that, on a significant number of past occasions, the user has opted not to interacted with a particular type of notification 546), and/or (C) a user is away from the office (e.g., if the first contextual data from the "user status" data store 614 indicates a personal time off (PTO) request has been approved for the user).

As indicated by an arrow 624 in FIG. 6, instances of event data that are classified (e.g., via a trained ML model of the event data classification engine 602) as "prioritize" may be passed directly to the priority score determination engine 606 (described below). For example, the event data classification engine 602 may determine to classify at least certain types of event data as "prioritize" when (A) the content of the event data indicates a high level of severity or importance, such as "Sev1" tickets, and the first contextual data, e.g., from the "user feed behavior" data store 612, indicates that the user has interacted with notifications 546 for the given type of event on at least some past occasions, and/or (B) a deadline is indicated by the event data, and the first contextual data, e.g., from the "user feed behavior" data store 612, indicates that the user has interacted with notifications 546 for the given type of event on at least some past occasions. Finally, as indicated by an arrow 626 in FIG. 6, instances of event data that are classified (e.g., via a trained ML model of the event data classification engine 602) as "delay" may be passed to the notification creation scheduling engine 604 where it may be held for some period of time before being passed along to the priority score determination engine 606, as indicated by an arrow 628. For example, the event data classification engine 602 may determine to classify at least certain types of event data as "delay" when the nature of the event is determined to be relatively time insensitive, e.g., a blog post, and/or the first contextual data indicates that a user is unlikely to interact with a notification 546 for the event in the near future, e.g., if the first contextual data from the "user feed behavior" data store 612 indicates that a user typically interacts with notifications 546 for the type of event only once per week, such as on Friday afternoons, of if the first contextual data from the "user status" data store 614 indicates the user has left work for the day and likely will not be on line again until the next morning.

As shown in FIG. 6, in addition to receiving the delayed event data for respective events, as indicated by the arrow 626, the notification creation scheduling engine 604 may additionally receive second contextual data, as indicated by the arrow 618, from one or more of the user-specific contextual data stores 608. The second contextual data indicated by the arrow 618 may be the same as or different than, in whole or in part, the first contextual data indicated by the arrow 616. Based on the delayed event data and the second contextual data, the notification creation scheduling engine 604 may determine an optimal time in the future to release the delayed event data to the priority score determination engine 606 for further processing. In some implementations, such a scheduling function may be performed by the notification creation scheduling engine 604 using one or more trained ML models. For example, in some implementations, for respective instances of delayed event data, at least a portion of the delayed event data and at least a portion of the second contextual data may be encoded into a feature vector consumable by a trained ML model, and the trained ML model may process such feature vector to select one of several future time windows within which to release the delayed event data to the priority score determination engine 606. Example processes for training one or more suitable ML models to perform such a scheduling task is described below in connection with FIG. 10.

As indicated by the arrows 624 and 628 in FIG. 6, the priority score determination engine 606 may receive both (A) event data that has been categorized as "prioritize" by the event data classification engine 602, and (B) event data that has been categorized as "delay" by the event data classification engine 602, after such delayed event data has been temporarily held by the notification creation scheduling engine 604 for some period of time. Further, as indicated by the arrow 620 in FIG. 6, in some implementations, the priority score determination engine 606 may additionally receive third contextual data from one or more of the user-specific contextual data stores 608. The third contextual data indicated by the arrow 620 may be the same as or different than, in whole or in part, the second contextual data indicated by the arrow 618 and/or the first contextual data indicated by the arrow 616. For respective instances of prioritized event data and delayed event data that are received, the priority score determination engine 606 may determine a priority score indicative of an estimated degree of urgency for generating a notification 546 for the corresponding event. In some implementations, such priority scores may be determined using a formula that takes into account various features of the prioritized event data or the delayed event data under consideration. In some implementation, some or all of the third contextual data may additional be taken into account when calculating respective priority scores. An example technique that may be used by the priority score determination engine 606 to calculate or otherwise determine priority scores for respective instances of prioritized event data and delayed event data is described below.

As indicated by the arrow 116 in FIG. 6, the priority score determination engine 606 may pass selected event data (i.e., prioritized event data received directly from the event data classification engine 602 and delayed event data received from the notification creation scheduling engine 604) and determined priority scores for that event data to the notification creation engine 104. The notification creation engine 104 may then determine the order in which to process instances of the selected event data to generate raw notifications, as described above in connection with FIG. 1, based at least in part on the priority scores that were assigned to such instances by the priority score determination engine 606. Although not illustrated in FIG. 6, it should be appreciated that, in some implementations, the notification creation engine 104 may be in communication with the notification creation scheduling engine 604 to streamline and optimize the scheduling operations performed by the notification creation scheduling engine 604. For example, in some implementations, the notification creation engine 104 may inform the notification creation scheduling engine 604 of its current backlog and/or processing capacity, thus enabling the notification creation scheduling engine 604 to override previously made scheduling decisions and/or adjust its scheduling protocol to either increase or decrease the rate at which instances of delayed event data are released to the priority score determination engine 606.

With respect to the above-described implementation, it should be appreciated that event data need not be passed amongst various physical components or systems, such as suggested by the arrows 114, 622 624, 626, 628, 116 depicted in FIG. 6, to achieve the described functionality. Instead, in some implementations, event data may remain in one repository but may be tagged or annotated to indicate its status or a value, such as a priority score, that has been assigned to it. For example, rather than transferring delayed event data from the event data classification engine 602 to the notification creation scheduling engine 604, as suggested by the arrow 626, and then transferring such delayed event data from the notification creation scheduling engine 604 to the priority score determination engine 606, as suggested by the arrow 628, the event data classification engine 602 may initially simply tag certain event data with a "delay" tag (rather than a "discard" tag or a "prioritize" tag) and the notification creation scheduling engine 604 may subsequently change the tag for that event data to "prioritize" at the time that such event data is to be assigned a priority score by the priority score determination engine 606. In such implementations, the priority score determination engine 606 may simply be configured to identify instances of event data that have been tagged as "prioritize," and then annotate those identified instances with a priority score determined as described above.

As noted above, the "user feed preferences" data store 610, the "user feed behavior" data store 612, and the "user status" data store 614 may store user-specific contextual data (e.g., the first contextual data, the second contextual data, and the third contextual data indicated by the arrows 616, 618, 620, respectively, in FIG. 6) that may be referenced by the event data classification engine 602, the notification creation scheduling engine 604, and the priority score determination engine 606 to achieve the functionality described herein. Various examples of the types of user-specific contextual data that may be stored in the data stores 610, 612, and 614 will now be described.

The "user feed preferences" data store 610 may, for example, keep information related to preferences that user may have explicitly configured, such as: (A) static relevance rankings to be applied to notifications 546 by system of record 526, recipient types (personal/group) etc., (B) permanent or windowed muting preferences of notifications 546 by system of record 526, source type (e.g., mute re-shared notifications 546 from a specific user/group), etc., (C) list of systems of record 526 the user 524 is subscribed to, (D) preferable time and date to receive notifications 546 from a particular system of record 526.

The "user feed behavior" data store 612 may, for example, store per user telemetry received as a result of end user interaction with the user's activity feed 544, whereby each telemetry event conveys user/system information that is relevant to inferring per user relevance preferences/user intent. A non-exhaustive list of such attributes comprises: (A) type and mass of user interactions by system of record 526, (B) type and mass of user interactions with non-actionable notifications 546, (C) type and mass of user interactions with actionable notifications 546, (D) type and mass of user interactions by notification source type (e.g., system of record generated, re-shared post, broadcast, etc.), (E) type of device in use (e.g., mobile, stationary, etc.), (F) time of the day, day of the week, etc., (G) cumulative session duration at the time of each user interaction, (H) discovered topics of interest of the user 524, (I) end-user response time on notifications 546, an (J) end-user engagement metrics.

The "user status" date store 614 may store information concerning the current status of the user 524. Such information may, for example, be based on inputs coming from various external and internal data sources, such as digital workplace systems, human capital management systems, online meeting scheduler applications, identity-based services, geo tracker applications, etc. A non-exhaustive list of such attributes comprises: (A) end-user work shift, (B) dates and times of end-user meetings, (C) end-user company travel schedule, (D) end-user PTO schedule, (E) company worldwide PTO schedule, (F) role/function of the user 524, and (G) end-user current location.

Figure 7:
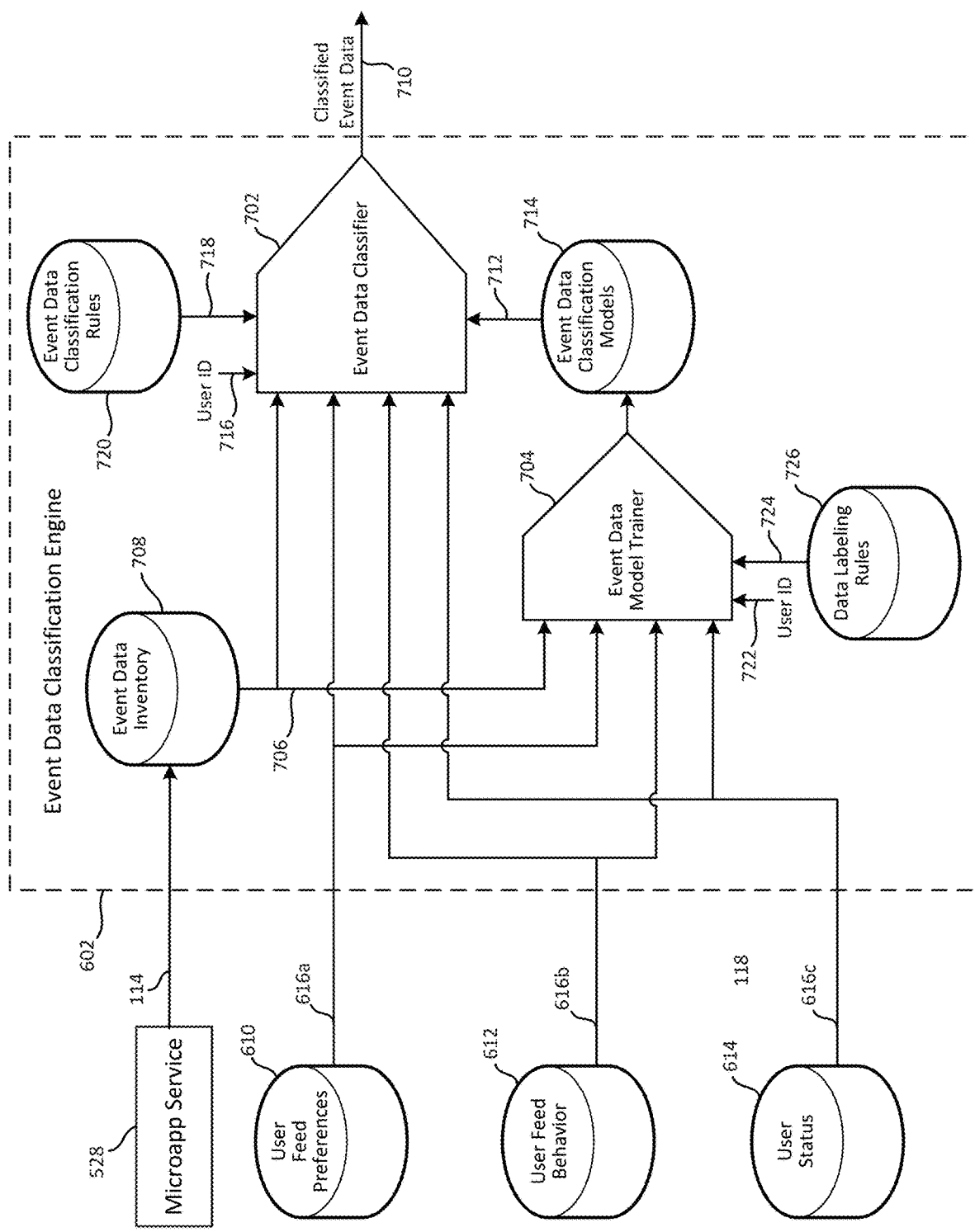
FIG. 7 shows additional details of the event data classification engine shown in FIG. 6.

FIG. 7 shows an example embodiment of the event data classification engine 602 shown in FIG. 6. As shown, the event data classification engine 602 may include both an event data classifier 702 and an event data model trainer 704. The event data classifier 702 may serve to classify newly-received instances of event data into one of three categories (e.g., "discard," "prioritize" or "delay") as discussed above. The event data model trainer 704 may serve to train one or more ML models that the event data classifier 702 may use to perform such a classification.

As indicated by the arrow 114 in FIG. 7, in some implementations, the microapp service 528 may store newly-received event data in an "event data inventory" data store 708. The data store 708 may store newly-received instances of event data that have not yet been categorized by the event data classifier 702, as well as historical instances of event data that were previously categorized by the event data classifier 702. As explained in more detail below, in some implementations, the event data model trainer 704 may use the historical event data stored in the "event data inventory" data store 708, together with historical first contextual data (see the arrow 616 shown in FIG. 6) associated with a user, e.g., as indicated by arrows 616a, 616b, and 616c shown in FIG. 7, to train one or more ML models for the user.

In some implementations, the "event data inventory" data store 708 (or another data store) may additionally store "notification metadata" that specifies certain parameters that are to be used by the event data classifier 702 to classify instances of event data and/or by the event data model trainer 704 to train one or more ML models for that purpose. For instance, in some implementations, such notification metadata may include one or more data fields that a system administrator may select and/or indicate are to be used for classifying event data. Such fields may or may not be displayed within a user interface of a notification 546. In some implementations, marking a field to be used for event data classification may cause the microapp service 528 (or another system component) to include data for that field in the event data that is written to the data store 708, e.g., per the arrow 114 in FIG. 7. As an example, a system administrator may indicate in the notification that the "severity" field of data from Jira is to be used for event data classification, and such an indication may result in a corresponding field being populated within the event data that is stored in the data store 708 when a data sync happens with Jira.

In some implementations, the notification metadata (stored in the "event data inventory" data store 708 or elsewhere) may additionally or alternatively indicate an order based on field values of particular data fields. For example, a system administrator may configure the notification metadata to indicate that, for Jira severity fields, "Sev1>Sev2>Sev3," which may imply that it is more important to generate "Sev1" notifications than "Sev2" notifications, and that it is more important to generate "Sev2" notifications than "Sev3" notifications. In some implementations, for example, the values obtained during a data sync may be listed so as to allow a system administrator to specify a ranked ordering for such values.

In some implementations, the notification metadata (stored in the "event data inventory" data store 708 or elsewhere) may additionally or alternatively indicate due dates for notifications relating to particular types of events. For some types of events, a system administrator may determine to explicitly set due dates for notifications, e.g., "ten" days from the time the notification is generated. For other types of events, the system administrator may instead configure the notification metadata to indicate that a particular data field (received from the system of record 526) that includes a date/time value is to be used as the due date for classification purposes.

As indicated by an arrow 712 in FIG. 7, the event data classifier 702 may retrieve one or more user-specific ML models from an "event data classification models" data store 714 for use in performing the classification of event data for a particular user that is stored in the "event data inventory" data store 708. The ML models for a given user may, for example, be retrieved from the data store 714 based on a user identifier (ID) for the user, as indicated by an arrow 716 in FIG. 7. The event data from that data store 708 that is to be classified may be provided to the event data classifier 702, as indicated by an arrow 706 in FIG. 7. Further, as indicated by the arrows 616a, 616b, and 616c in FIG. 7, the event data classifier 702 may take into account first contextual data (see the arrow 616 shown in FIG. 6) associated with a user (e.g., from the "user feed preferences" data store 610, the "user feed behavior" data store 612, and the "user status" data store 614) when determining how to classify newly-received instances of event data.

In some implementations, the event data classifier 702 may additionally or alternatively make its classification decision based on one or more classification policies that may be retrieved, e.g., as indicated by an arrow 718 in FIG. 7, from an "event data classification rules" data store 720, based on the user ID or otherwise. Such classification policies may be based on any of a number of factors. In some implementations, such policies may be defined by a system administrator and may be employed separately from, e.g., prior to, evaluation by one or more trained ML models. For example, in some implementations, event data may be compared against these policies as an initial check and, if one or more policies are satisfied, that event data may be classified as defined by the policy without the need to also evaluate it using the ML model(s).

In some implementations, one or more policies defined in the data store 720 may be based on the content of the event data, e.g., based on the values of one or more fields. For example, a system administrator may configure a rule specifying that, for a data record having a "severity" field, a value of "Sev1" triggers a "prioritize" classification, a value of "Sev2" triggers a "delay" classification, and a value of "Sev4" triggers a "discard" classification. As another example, for event data that comes from a particular system of record and also include a "topic" field, a value of "security" for the "topic" field may trigger a "delay" classification, and any other value for the "topic" field may trigger a "discard" classification.

In some implementations, one or more policies defined in the data store 720 may additionally or alternatively be based on dues dates, e.g., specified by the notification metadata and/or indicated in the event data itself, as discussed above. For example, a system administrator may configure a rule specifying that, for event data for which a due date is known, a value less than "5 days" triggers a "prioritize" classification, and a value greater than "60 days" triggers a "delay" classification.

Further, in some implementations, one or more policies defined in the data store 720 may additionally or alternatively be based on first contextual data from the "user status" data store 614, e.g., as indicated by the arrow 616c in FIG. 7. For example, a system administrator may configure a rule specifying that, for data having a "severity" field, if a user is on PTO (e.g., as indicated by first contextual data from the data store 614), then event data is to be classified as "discard" unless the severity level is "Sev1," thus ensuring that notifications for the user are generated only for the most severe events. As another example, a system administrator may configure a rule specifying that, for data having a "severity" field, if a user is in a meeting (e.g., as indicated by first contextual data from the data store 614), then event data that has been classified by one or more ML models as "prioritize" is to be reclassified as "delay" unless the severity level is "Sev1," thus ensuring that notifications are generated immediately only for severe events.

And still further, in some implementations, one or more policies defined in the data store 720 may additionally or alternatively be based on first contextual data from the "user feed preferences" data store 610, e.g., as indicated by the arrow 616a in FIG. 7. For example, the "user feed preferences" data store 610 may store one or more preferences the user has set concerning how certain types of event data is to be classified, either categorically or in one or more particular circumstances. A user may, for example, set a preference that causes security blog notifications to always be marked "discard," or that causes all security blog notifications to be marked as "discard" if the user is on PTO (e.g., as may be indicated by first contextual data from the "user status" data store 614).

In some implementations, upon determining a classification for newly-received event data, the event data classifier 702 may mark that event data in the data store 708 with a tag indicative of the determined classification. The arrow 710 shown in FIG. 7 may correspond to the arrows 622, 624 and 626 shown in FIG. 6 which represent the classification of event data as "discard," "prioritize" and "delay," respectively, by tagging such event data in the "event data inventory" data store 708 or otherwise. Once event data has been classified in such a manner, the classified event data may be (A) discarded/ignored (per the arrow 622 in FIG. 6), (B)

further processed by the notification creation scheduling engine 604 (per the arrow 626 in FIG. 6), or (C) further processed by the priority score determination engine 606 (per the arrows 624, 628 in FIG. 6), as described above.

As noted above, the "event data classification models" data store 714 may store one or more user-specific ML models that may be used by the event data classifier 702 to classify event data for a particular user. Further, as indicated by the arrows 616a, 616b, and 616c in FIG. 7, such ML models receive as inputs first contextual data (see the arrow 616 shown in FIG. 6) associated with a user (e.g., from the "user feed preferences" data store 610, the "user feed behavior" data store 612, and the "user status" data store 614) when determining how to classify newly-received instances of event data. In some implementations, the user-specific ML models stored in the data store 714 may be trained by the event data model trainer 704 shown in FIG. 7.

As shown in FIG. 7, similar to the event data classifier 702, the event data model trainer 704 may receive data from the "event data inventory" data store 708, the "user feed preferences" data store 610, the "user feed behavior" data store 612, and the "user status" data store 614, e.g., as indicated by the arrows 706, 616a, 616b, and 616c, respectively. The historical data for a particular user 524 for whom one or ML models are to be trained may obtained, for example, based on a user ID for that user 524, e.g., as indicated by an arrow 722 in FIG. 7. Unlike the event data classifier 702, most, if not all, of the data received by the event data model trainer 704 may be historical data representing instances of event data that was previously processed to generate notifications 546 as well as user-specific contextual information relating to the circumstances that existed when such notifications 546 were generated and/or the manner in which a user 524 subsequently interacted with such notifications 546 in the user's activity feed 544. The event data model trainer 704 may use such historical data to train one or more ML models to categorize instances of event data in any of a number of ways. One example routine 800 that the event data model trainer 704 may employ to train suitable user-specific ML models is shown in FIGS. 8A-C.

Figure 8A:
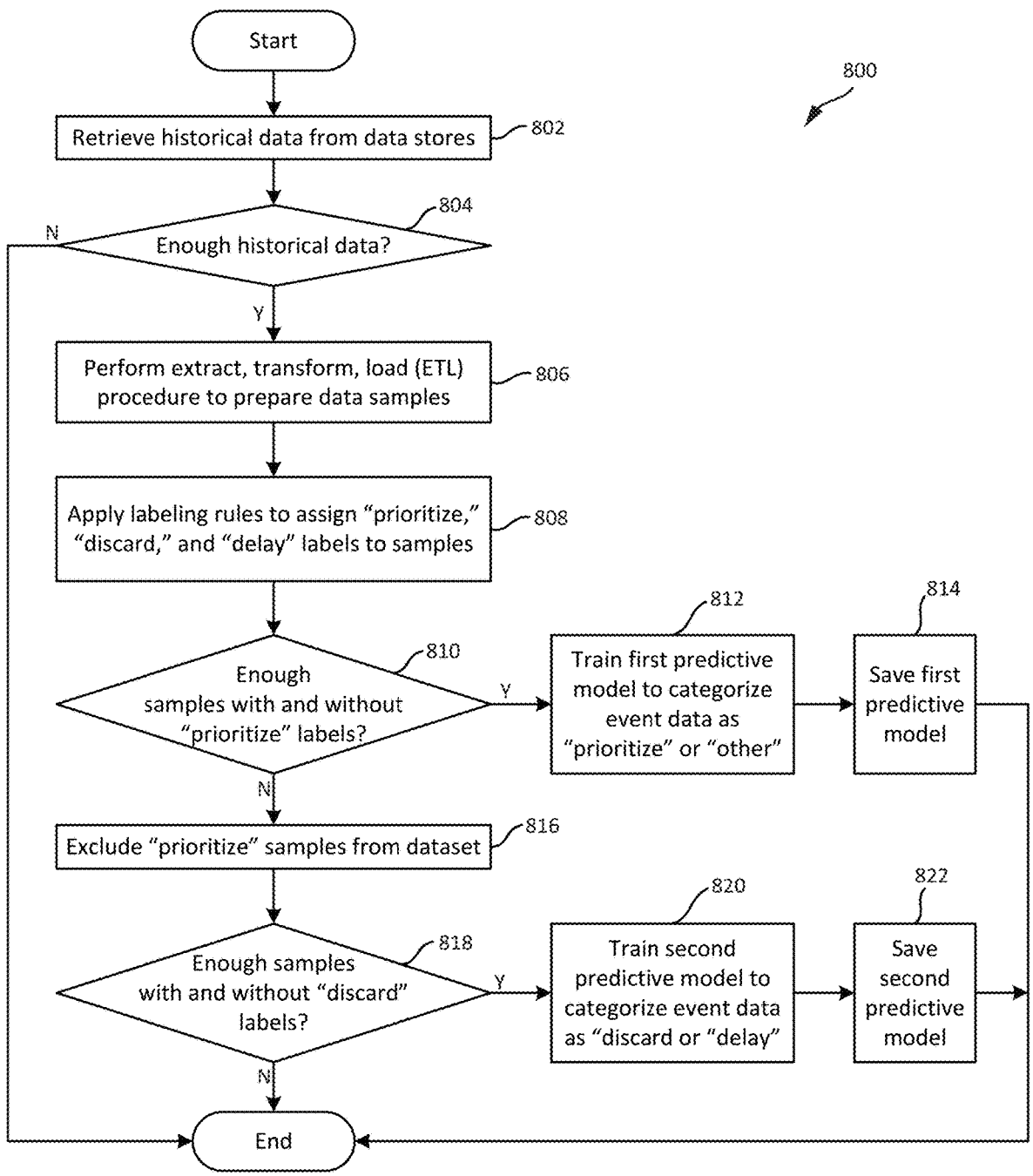
FIG. 8A is a flow chart showing an example routine that may be executed by the event data model trainer shown in FIG. 7 in accordance with some embodiments of the present disclosure.

As shown in FIG. 8A, the routine 800 may begin at a step 802, at which the event data model trainer 704 may retrieve historical data from the "event data inventory" data store 708, the "user feed preferences" data store 610, the "user feed behavior" data store 612, and the "user status" data store 614, e.g., as indicated by the arrows 706, 616a, 616b, and 616c in FIG. 7, respectively, for further analysis.

As a decision step 804 of the routine 800, the event data model trainer 704 may determine whether a sufficient amount of historical data exists to suitably train one or more ML models. In some implementations, a period of "30" days may provide a suitable amount of historical data. However, the time period of historical data may be configurable and determined based on the level of user interaction with the activity feed 544 or other parameters. When, at the decision step 804, the event data model trainer 704 determines that there is not enough historical data, the routine 800 may terminate. When, on the other hand, the event data model trainer 704 determines (at the decision step 804) that there is enough historical data, the routine 800 may instead proceed to a step 806, at which the event data model trainer 704 may perform a suitable extract, transform, load (ETL) procedure on the retrieved historical data to shape it into the correct format for the further processing steps that follow.

At a step 808 of the routine 800, the event data model trainer 704 may assign labels to at least some of the historical data prepared at the step 806, so that a machine learning model can learn from it. The assigned labels may, for example, correspond to the classifications used by the event data classifier 702, i.e., "discard," "prioritize," and "delay," as discussed above. In some implementations, the event data model trainer 704 may use a set of rules, e.g., as defined by a system administrator or otherwise, to evaluate the historical data for respective events and assign appropriate labels to such data. As indicated by an arrow 724 in FIG. 7, in some implementations, such labeling rules may be retrieved from a "data labeling rules" data store 726. The retrieved rules may, for example be applied against the event data, contextual information, and/or notification metadata that is included in the historical data, to determine appropriate labels. Examples of ways in which the event data model trainer 704 may apply such historical data labeling rules include (A) historical data for a notification 546 that is assigned high priority/importance (based on notification metadata—e.g., Jira Ticket with Severity 1) may be assigned a "prioritize" label, (B) historical data for a notification 546 of a certain type with which the user 524 has interacted positively in the past may be assigned a "prioritize" label, (C) historical data for a notification 546 of a certain type with which the user 524 has interacted negatively (e.g., always dismiss that type of notification) in the past may be assigned a "discard" label, (D) historical data for a notification 546 of a certain type and with a certain "topic" field that matches the discovered preferred topics of the user (e.g., that the user 524 prefers notifications 546 with "security" content) may be assigned a "prioritize" label, and (E) historical data for a notification 546 of a certain type that refers to a worldwide/region-based trending topic (e.g., Covid-crisis, earthquakes, terrorist attacks) affecting the organization and employees may be assigned a "prioritize" label. The foregoing are only a handful of examples of the myriad of labeling rules that may be applied to suitably label the historical data that is to be used for ML model training. As noted, such rules may configured and/or adjusted by a system administrator, as needed.

Per steps 810-822 of the routine 800, the event data model trainer 704 may generate two different predictive models that may together allow the event data classifier 702 to perform a three way classification of event data. In particular, at the step 812, the event data model trainer 704 may train a first predictive model that is capable of classifying event data as either "prioritize" or "other," and, at the step 820, the event data model trainer 704 may train a second predictive model that is capable of classifying event data as either "discard" or "delay." As shown, at a step 816, the event data model trainer 704 may exclude historical data samples labeled as "prioritize" from the data set under consideration prior to training the second predictive model, thus enabling the training of the second predictive model to perform a two-way classification (i.e., "discard" vs. "delay") of the remaining data. Example implementations of the steps 812 and 820 shown in FIG. 8A are described in detail below in connection with FIGS. 8B and 8C.

In some implementations, upon receipt of the first and second predictive models trained in this manner, the event data classifier 702 (shown in FIG. 7) may initially employ the first predictive model to determine whether event data is to be classified as "prioritize" or "other." In the event that the first predictive model classifies the event data as "other," the event data classifier 702 may employ the second predictive model to determine whether to classify the event data as "discard" or "delay."

As shown in FIG. 8A, at a decision step 810, the event data model trainer 704 may determine to proceed with training the first predictive model (per step 812) only if it determines that the historical data set under consideration includes an adequate number of samples that have been labeled (per the step 808) as "prioritize" as well as an adequate number of samples that have not been labeled (per the step 808) as "prioritize." Similarly, at a decision step 818, the event data model trainer 704 may determine to proceed with training the second predictive model (per the step 820) only if it determines that the historical data set under consideration includes an adequate number of samples that have been labeled (per the step 808) as "discard" as well as an adequate number of samples that have not been labeled (per the step 808) as "discard."

As also shown in FIG. 8A, at the steps 814 and 822, the event data model trainer 704 may store the first predictive model and the second predictive model, respectively, for subsequent access and use by the event data classifier 702 in the manner described above. In some implementations, for example, the first predictive model and the second predictive model that are trained for a particular user may be stored in the "event data classification models" data store 714, and may be subsequently retrieved from the data store 714 for use in classifying event data for such a user based on a user ID for that user.

The inventors have recognized and appreciated that, by nature, the assignment of "prioritize" and "discard" labels to the historical data is simpler and more intuitive as compared to the case of "delay" labels. Further, particularly when a large number of contextual attributes are provided as inputs, as it is not straightforward to identify the more important ones to consider for the purpose of assigning appropriate labels. At the same time, it is possible that historical data samples that ought to be put in different categories may, in fact, be very close to each other. These factors, as well as others, can make the generation of a well-performed trained classification model for the data set in question a non-trivial task. To this end, the inventors have recognized and appreciated that, in some implementations, it may be beneficial to employ semi-supervised learning, i.e., a combination or supervised and unsupervised learning processes, to generate the first and second predictive models discussed above. As described below, in some implementations, one or more autoencoders (AEs), and, in particular, one or more undercomplete AEs, may be used for this purpose.

An autoencoder is a type of artificial neural network used to learn efficient data codings in an unsupervised manner. The aim of an autoencoder is to learn a representation (encoding) for a set of data, typically for dimensionality reduction, by training the network to ignore signal "noise." Along with the reduction side, a reconstructing side is learned, where the autoencoder tries to generate from the reduced encoding a representation as close as possible to its original input, hence its name. An example autoencoder 900 is shown in FIG. 9.

Figure 9:
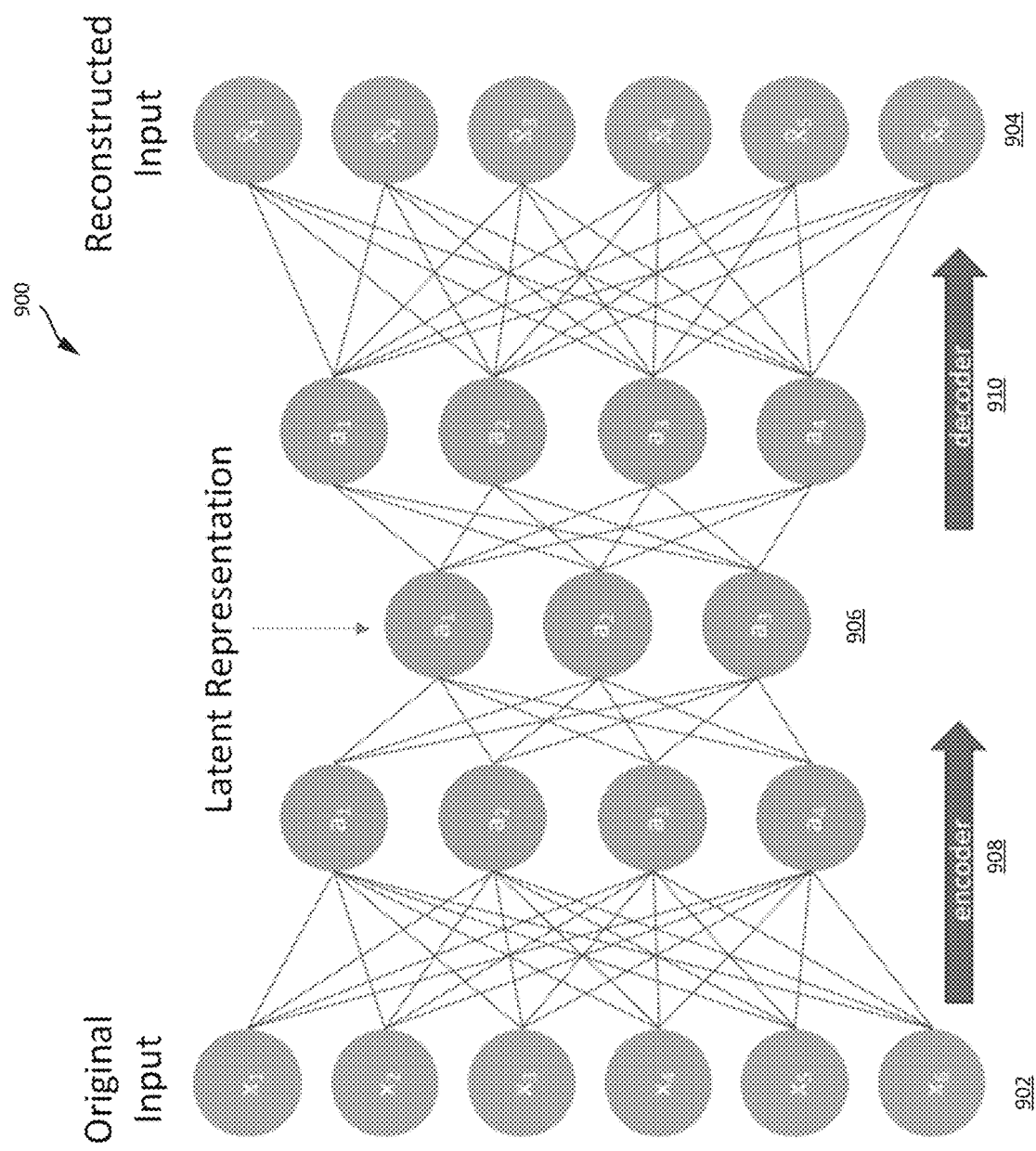
FIG. 9 show an example of an undercomplete autoencoder that may be employed by the event data model trainer shown in FIG. 7 in accordance with some embodiments of the present disclosure.

As shown in FIG. 9, the autoencoder 900 may be a neural network that learns to copy its input 902 to its output 904. The autoencoder 900 may have one or more internal (hidden) layers that describes a latent representation 906, sometimes referred to as a "code," that is used to represent the input 902. The autoencoder 900 includes two main parts: (1) an encoder 908 that maps the input 902 into the latent representation 906 described by the hidden layer(s), and (2) a decoder 910 that maps the latent representation 906 to a reconstruction of the input. The autoencoder 900 shown in FIG. 9 is "undercomplete," because the feature space of the latent representation 906 described by the hidden layer(s) is smaller than the feature space of the input 902.

As noted previously, FIGS. 8B and 8C show example implementations of the steps/routines 812 and 820, respectively, of the routine 800 (shown in HQ. 8). As will now be described, the steps/routines 812 and 820 may employ undercomplete autoencoders, such as the autoencoder 900 shown in FIG. 9, as a part of a semi-supervised leaning processes that may be used to generate the first and second predictive models described above.

At a step 824a of the step/routine 812, the event data model trainer 704 may split the historical data set prepared at the step 806 into two sample groups based on the labels applied at the step 808. As indicated, samples having a "prioritize" label may be put into one group and the remaining samples, either because they have a different label or because they were not assigned a label at the step 808, may be put into an "other" group.

At a step 826a of the step/routine 812, the event data model trainer 704 may train a first autoencoder model, such as the undercomplete autoencoder 900 shown in FIG. 9, based solely on the samples labeled as "prioritize." As such, the first autoencoder model may be trained to learn the best representation of such cases.

At a step 828a of the step/routine 812, the event data model trainer 704 may use the first autoencoder model, trained per the step 826a, to create another model, referred to herein as a first "latent representation model," that may be used to encode an input sample based on the latent representation of the first (trained) autoencoder model. Such a latent representation model may be created, for example, by accessing the weights of the hidden layer(s) of the first autoencoder model through the layer where latent representation exists, and adding those weights to corresponding sequential layers of a new model.

At a step 830a of the step/routine 812, the event data model trainer 704 may store the first latent representations model, e.g., in the "event data classification models" data store 714, for subsequent use both by the event data model trainer 704, as described below in connection with a step 832a, and by the event data classifier 702, together with the first predictive model, for classifying new instances of event data as either "prioritize" or "other," as described in more detail below.

At the step 832a of the step/routine 812, the event data model trainer 704 may generate a first training data set by processing both the samples in the "prioritize" group and the samples in the "other" group with the first latent representation model created at the step 828a to produce encoded (i.e., reduced dimension) versions of such samples. As a result of the foregoing process, it is expected that the encoded versions of the "prioritized" samples and the "other" samples will be better differentiated from one another than the un-encoded versions of those same samples.

At a step 834a of the step/routine 812, the encoded versions of the "prioritize" and "other" samples may be used, via a supervised learning process, to train the first predictive model to categorize similarly encoded versions of new samples as either "prioritize" or "other." As noted above in connection with the step 814 of the routine 800 (shown in FIG. 8A), the first predictive model that is so trained may be stored, for example, in the "event data classification models" data store 714. Thereafter, the event data classifier 702 may retrieve both the first latent representation model and the first predictive model from the data store 714, and use such models, together, to classify newly-received instances of event data as either "prioritize" or "other." For example, in some implementations, the event data classifier 702 may initially use the first latent representation model to generate an encoded version of a newly-received data sample, as discussed above, and may thereafter use the first predictive model to classify that encoded sample as either "prioritize" or "other."

Referring next to FIG. 8C, at a step 824b of the step/routine 820, the event data model trainer 704 may split the historical data set that remains after excluding the samples with a "prioritize" label (per the step 816 of the routine 800 shown in FIG. 8A), into two sample groups based on the labels applied at the step 808. As indicated, samples having a "discard" label may be put into one group and the remaining samples, either because they have a "delay" label, or because they were not assigned a label at the step 808, may be put into an "other" group.

At a step 826b of the step/routine 820, the event data model trainer 704 may train a second autoencoder model, such as the undercomplete autoencoder model 900 shown in FIG. 9, based solely on the samples labeled as "discard." As such, the second autoencoder model may be trained to learn the best representation of such cases.

At a step 828b of the step/routine 820, the event data model trainer 704 may use the second autoencoder model, trained per the step 826b, to create a second latent representation model that may be used to encode an input sample based on the latent representation of the second (trained) autoencoder model. Such a second latent representation model may be created, for example, by accessing the weights of the hidden layer(s) of the second autoencoder model through the layer where latent representation exists, and adding those weights to corresponding sequential layers of a new model.

At a step 830b of the step/routine 820, the event data model trainer 704 may store the second latent representations model, e.g., in the "event data classification models" data store 714, for subsequent use both by the event data model trainer 704, as described below in connection with a step 832b, and by the event data classifier 702, together with the second predictive model, for classifying new instances of event data as either "discard" or "delay," as described in more detail below.

At the step 832b of the step/routine 820, the event data model trainer 704 may generate a second training data set by processing both the samples in the "discard" group and the samples in the "other" group with the second latent representation model created at the step 828b to produce encoded (i.e., reduced dimension) versions of such samples. As a result of the foregoing process, it is expected that the encoded versions of the "delay" samples and the "other" samples will be better differentiated from one another than the un-encoded versions of those same samples.

At a step 834b of the step/routine 820, the encoded versions of the "delay" and "other" samples may be used, via a supervised learning process, to train the second predictive model to categorize similarly encoded versions of new samples as either "delay" or "other." Because the "prioritize" samples were removed (per the step 816), the samples categorized as "other" in this circumstance may be deemed to have been put to the "delay" category. As noted above in connection with the step 822 of the routine 800 (shown in FIG. 8A), the second predictive model that is so trained may be stored, for example, in the "event data classification models" data store 714. Thereafter, the event data classifier 702 may retrieve both the second latent representation model and the second predictive model from the data store 714, and use such models, together, to classify newly-received instances of event data as either "discard" or "delay." For example, in some implementations, the event data classifier 702 may initially use the second latent representation model to generate an encoded version of a newly-received data sample, as discussed above, and may thereafter use the second predictive model to classify that encoded sample as either "discard" or "delay."

As described above in connection with FIG. 6, in some implementations, instances of event data that are classified (e.g., via one or more trained ML models of the event data classification engine 602) as "delay" may be passed to the notification creation scheduling engine 604 where it may be held for some period of time before being passed along to the priority score determination engine 606. Further, as was also noted above, in addition to receiving the delayed event data for respective events, as indicated by the arrow 626, the notification creation scheduling engine 604 may additionally receive second contextual data, as indicated by the arrow 618, from one or more of the user-specific contextual data stores 608. Based on the delayed event data and the second contextual data, the notification creation scheduling engine 604 may determine an optimal time in the future to release the delayed event data to the priority score determination engine 606 for further processing.

The ultimate goal of the notification creation scheduling engine 604 is to predict, based at least in part on the second contextual data, the optimal times for generating notifications 546 that have been categorized as "delay." The times at which such notifications are sent may be a significant driver of user engagement. If notifications 546 are sent at appropriate times, a user might have a positive experience and thus continue to engage with the user's activity feed 544. Poorly timed notifications 546, on the other hand, may have the opposite effect.

Figure 10:
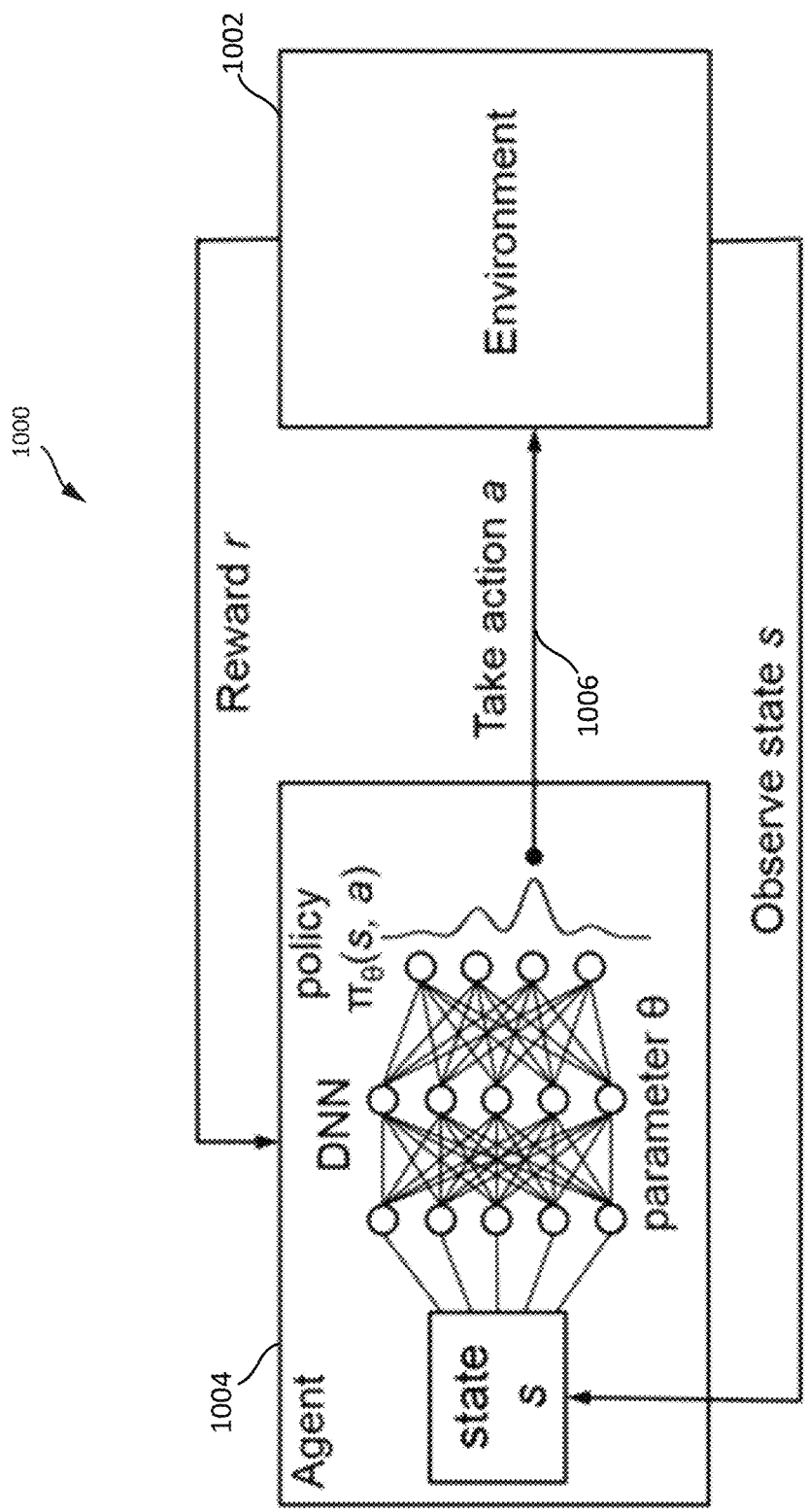
FIG. 10 shows an example of a reinforcement learning (RL) framework that may be employed by the notification creation scheduling engine shown in FIG. 6 in accordance with some embodiments of the present disclosure.

The inventors have recognized and appreciated that a reinforcement learning (RL) approach may provide a good solution to the problem of predicting the optimal times for generating notifications based on "delayed" event data. Reinforcement learning (RL) is a general framework where agents can learn to perform actions in an environment so as to maximize a reward. An example reinforcement learning (RL) framework 1000 is shown in FIG. 10. As shown in FIG. 10, an RL framework may include two primary components, including an environment 1002, which represents the problem to be solved, and an agent 1004, which represents a learning algorithm.

The agent 1004 and the environment 1002 may continuously interact with one another. For example, at respective time steps, the agent 1004 may take an action "a," e.g., as indicated by an arrow 1006 in FIG. 10, on the environment 1002 based on its policy "$\pi\theta$ (s, a)," where "s" is the current observation from the environment 1002, and may subsequently receive a reward "r" and the next observation from the environment. The goal is to improve the policy so as to maximize the sum of rewards (return).

In some implementations, such an RL framework may be employed by the notification creation scheduling engine 604 as follows. The state "s" considered by agent 1004 of the RL framework may be derived from a user's historical interactions with previous delivered notifications. Data indicative of such historical interactions may, for example, be obtained from the "user feed behavior" data store 612, e.g., as the second contextual data indicated by the arrow 618 in FIG. 6.

In some implementations, such second contextual data may be retrieved for a time window including the past "30" days (or some other measure of time), and the data points of the retrieved data may be structured as a time series.

The action "a" taken by the agent 1004 may, for example, be the hour of the day at which the next notification is to be generated and sent. Accordingly, such an implementation, there may be "24" possible and available actions.

The reward "r" provided to the agent 1004 from the environment 1002 may, for example, be an indication as to whether the user 524 interacted with the notification. For instance, a positive reward "r" may be provided when the user 524 interacted with the delivered notification 546, and no reward may be provided when the user 524 did not interact with the delivered notification 546. In this manner, the agent 1004 may be trained to select optimal future times at which notifications are to be generated, based on the rewards the agent received for successfully predicting appropriate times on past occasions. Any of a number of deep RL algorithms may be used to train the agent 1004 for use in the notification creation scheduling engine 604. Examples of suitable algorithms include: the Deep Q-Network (DQN) algorithm, the Proximal Policy Optimization (PPO) algorithm, the Deep Deterministic Policy Gradient (DDPG) algorithm, the Twin Delayed DDPG (TD3) algorithm, and the Soft Actor Critic (SAC) algorithm.

In some implementations, a batch training workflow may run periodically (e.g., on a daily basis) to update the agent 1004 and generate times to send the next candidate notifications. Such a workflow may, for example, gather the following data for training: (A) the state of the user (e.g., based on the second contextual data describe above) from "2" days ago, (B) the action (e.g., hour at which a notification was sent) from "2" days ago, (C) the next state of the user (e.g., based on the second contextual data describe above) from "1" day ago, and (D) the rewards representing the degree of user engagement with notifications 546, (e.g., based on the second contextual data describe above) from "1" day ago. For each end-user, this information may be assembled into a trajectory of (state, action, next state, reward). This set of trajectories may then be used to update the existing RL agent 1004, such as by running through a deep learning workflow so as to cause values of the neural network representing the agent 1004 to be updated to better reflect the relationships between states, actions, and long term rewards.

As discussed above in connection with FIG. 6, for respective instances of prioritized event data and delayed event data that are received by the priority score determination engine 606, e.g., as indicated by the arrows 624 and 626 in FIG. 6, the priority score determination engine 606 may determine a priority score indicative of an estimated degree of urgency for generating a notification 546 for the corresponding event. Further, as was also described in connection with FIG. 6, in some implementations, the priority score determination engine 606 may additionally receive third contextual data, e.g., as indicated by the arrow 620 in FIG. 6, from one or more of the user-specific contextual data stores 608. At a given time, there can be a very large inflow of event data that needs to be processed to generate notifications. By generating priority scores for respective events based on the third contextual data, the priority score determination engine 606, may determine an optimal order in which notifications are to be generated. For example, the assignment of higher priority scores to event data instances may cause the notification creation engine 104 (shown in FIGS. 1 and 6) to generate notifications for those instances earlier than it generates notifications 546 for event data instances having lower priority scores. The priority score determination engine 606 may determine priority scores in any of a number of ways. In some implementations, for example, a formula-based approach may be used that takes into account various contextual data factors (e.g., as included in the third contextual data indicated by the arrow 620 shown in FIG. 6). Further, in some implementations, different weights maybe applied to respective factors such that some factors may have a greater influence on the priority score than other factors.

An example equation, i.e., Equation 1, that may be used to calculate priority scores for respective instances of event data is shown below:

$$\text{Priority Score} = \text{DueTime}_{Weight} * \text{DueTime}_{Value} + \\ \text{UserContext}_{Weight} * \text{UserContext}_{Value} + \\ \text{Data}_{Weight} * \text{Data}_{Value} + \\ \text{UserBehavior}_{Weight} * \text{UserBehavior}_{Value} \quad \text{Equation 1}$$

Descriptions of each of the example variables in the above equation, as well as example values for those variables, are provided below. It should be appreciated, however, that Equation 1 and the example values provided below represent only one of a myriad of possibilities for calculating priority scores based on the event data, the notification metadata and/or the user-specific contextual data described above, and that other equations and/or techniques for calculating such priority scores are both contemplated and possible.

In some implementations, the value of the $\text{DueTime}_{Value}$ variable in Equation 1 may be determined, for example, from a lookup table, such as Table 1 below, in which the DueDate variable represents a determined due date for the notification. As discussed above in connection with FIG. 7, such a due date may be determined, for example, from notification metadata that may be stored in the "event data inventory" data store 708. As an example, the weighting value of $\text{DueTime}_{Weight}$ variable in Equation 1 may be "35."

TABLE 1

| DueDate | $\text{DueTime}_{Value}$ |
|---|---|
| Others/No Due Time | 0 |
| 16-30 days | 1 |
| 6-15 days | 2 |
| 2-5 days | 3 |
| 1-2 days | 4 |

In some implementations, the value of the $\text{UserContext}_{Value}$ variable in Equation 1 may be determined, for example, from a lookup table, such as Table 2 below, in which the UserContext variable represents a determined context of the user for whom the event data is being evaluated. The value of UserContext variable may be determined, for example, from a portion of the third contextual data (e.g., as indicated by the arrow 620 shown in FIG. 7) that is received from the "user status" data store 614. As an example, the weighting value of $\text{UserContext}_{Weight}$ variable in Equation 1 may be "30."

TABLE 2

| UserContext | $\text{UserContext}_{Value}$ |
|---|---|
| PTO | 1 |
| Not in work hours | 2 |
| Commuting | 3 |
| Meeting | 4 |

In some implementations, the value of the Data$_{Value}$ variable in Equation 1 may be determined, for example, from a lookup table, such as Table 3 below, in which the Importance variable represents a determined importance or severity the notification. The value of the Importance variable may be determined, for example, from notification metadata that may be stored in the "event data inventory" data store 708. As an example, the weighting value of Data$_{Weight}$ variable in Equation 1 may be "25."

TABLE 3

| Importance | Data$_{Value}$ |
|---|---|
| Sev 3 | 1 |
| Sev 2 | 2 |
| Sev 1 | 3 |

In some implementations, the value of the UserBehavior$_{Value}$ variable in Equation 1 may be determined, for example, using one or more ML models trained to produce a score value based on a portion of the third contextual data (e.g., as indicated by the arrow 620 shown in FIG. 7) that is received from the "user feed behavior" data store 612. As an example, the weighting value of UserBehavior$_{Weight}$ variable in Equation 1 may be "10."

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may involve receiving, by a computing system, at least first data indicative of a first event of a first system of record accessed using first access credentials associated with a user; determining, by the computing system and based at least in part on first stored contextual data associated with the user, to create at least a first notification of the first event based at least in part on the first data; and sending, by the computing system, the first notification to a client device operated by the user.

(M2) A method may be performed as described in paragraph (M1), and may further involve retrieving, by the computing system, the first data using the first access credentials and a first application programing interface (API) of the first system of record.

(M3) A method may be performed as described in paragraph (M1) or paragraph (M2), and may further involve receiving, by the computing system, second data indicative of a second event of a second system of record accessed using second access credentials associated with the user; and determining, by the computing system and based at least in part on the first stored contextual data, to refrain from creating a second notification of the second event based at least in part on the second data.

(M4) A method may be performed as described in paragraph (M1) or paragraph (M2), and may further involve receiving, by the computing system, second data indicative of a second event of a second system of record accessed using second access credentials associated with the user; and determining, by the computing system and based at least in part on the first stored contextual data, to delay creating a second notification of the second event based at least in part on the second data.

(M5) A method may be performed as described in paragraph (M4), and may further involve determining, by the computing system and based at least in part on second stored contextual data associated with the user, a future time at which the computing system is to create the second notification; creating, by the computing system, the second notification at the future time; and sending, by the computing system, the second notification to the client device.

(M6) A method may be performed as described in paragraph (M4) or paragraph (M5), and may further involve receiving, by the computing system, third data indicative of a third event of a third system of record accessed using third access credentials associated with the user; and determining, by the computing system and based at least in part on the first stored contextual data, to refrain from creating a third notification of the third event based at least in part on the third data.

(M7) A method may be performed as described in paragraph (M1) or paragraph (M2), and may further involve receiving, by the computing system, second data indicative of a second event of a second system of record accessed using second access credentials associated with the user; determining, by the computing system and based at least in part on the first stored contextual data, to create a second notification of the second event based at least in part on the second data; determining, by the computing system, a first priority score for the first data; determining, by the computing system, a second priority score for the second data; and determining, by the computing system and based at least in part on the first priority score and the second priority score, to create the first notification prior to creating the second notification.

(M8) A method may be performed as described in paragraph (M7), wherein the first priority score and the second priority score may be determined based at least in part on third stored contextual data associated with the user.

(M9) A method may be performed as described in any of paragraphs (M1) through (M8), and may further involve configuring, by the computing system, the first notification to include at least a first user interface element that can be selected to cause an action to be taken with respect to the first system of record; and causing, by the computing system, the action to be taken with respect to the first system of record in response to selection of the first user interface element.

The following paragraphs (S1) through (S9) describe examples of systems and devices that may be implemented in accordance with the present disclosure.

(S1) A computing system may comprise at least one processor and at least one computer-readable medium encoded with instructions which, when executed by the at least one processor, cause the computing system to receive at least first data indicative of a first event of a first system of record accessed using first access credentials associated with a user, to determine, based at least in part on first stored contextual data associated with the user, to create at least a first notification of the first event based at least in part on the first data, and to send the first notification to a client device operated by the user.

(S2) A computing system may be configured as described in paragraph (S1), and the at least one computer-readable medium may be encoded with additional instructions which, when executed by the at least one processor, further cause the computing system to retrieve the first data using the first access credentials and a first application programing interface (API) of the first system of record.

(S3) A computing system may be configured as described in paragraph (S1) or paragraph (S2), and the at least one computer-readable medium may be encoded with additional instructions which, when executed by the at least one processor, further cause the computing system to receive second data indicative of a second event of a second system of record accessed using second access credentials associated with the user, and to determine, based at least in part on the first stored contextual data, to refrain from creating a second notification of the second event based at least in part on the second data.

(S4) A computing system may be configured as described in paragraph (S1) or paragraph (S2), and the at least one computer-readable medium may be encoded with additional instructions which, when executed by the at least one processor, further cause the computing system to receive second data indicative of a second event of a second system of record accessed using second access credentials associated with the user, and to determine, based at least in part on the first stored contextual data, to delay creating a second notification of the second event based at least in part on the second data.

(S5) A computing system may be configured as described in paragraph (S4), and the at least one computer-readable medium may be encoded with additional instructions which, when executed by the at least one processor, further cause the computing system to determine, based at least in part on second stored contextual data associated with the user, a future time at which the computing system is to create the second notification, to create the second notification at the future time, and to send the second notification to the client device.

(S6) A computing system may be configured as described in paragraph (S4) or paragraph (S5), and the at least one computer-readable medium may be encoded with additional instructions which, when executed by the at least one processor, further cause the computing system to receive third data indicative of a third event of a third system of record accessed using third access credentials associated with the user, and to determine, based at least in part on the first stored contextual data, to refrain from creating a third notification of the third event based at least in part on the third data.

(S7) A computing system may be configured as described in paragraph (S1) or paragraph (S2), and the at least one computer-readable medium may be encoded with additional instructions which, when executed by the at least one processor, further cause the computing system to receive second data indicative of a second event of a second system of record accessed using second access credentials associated with the user, to determine, based at least in part on the first stored contextual data, to create a second notification of the second event based at least in part on the second data, to determine a first priority score for the first data, to determine a second priority score for the second data, and to determine, based at least in part on the first priority score and the second priority score, to create the first notification prior to creating the second notification.

(S8) A computing system may be configured as described in paragraph (S7), and the at least one computer-readable medium may be encoded with additional instructions which, when executed by the at least one processor, further cause the computing system to determine the first priority score and the second priority score based at least in part on third stored contextual data associated with the user.

(S9) A computing system may be configured as described in any of paragraphs (S1) through (S8), and the at least one computer-readable medium may be encoded with additional instructions which, when executed by the at least one processor, further cause the computing system to configure the first notification to include at least a first user interface element that can be selected to cause an action to be taken with respect to the first system of record, and to cause the action to be taken with respect to the first system of record in response to selection of the first user interface element.

The following paragraphs (CRM1) through (CRM9) describe examples of computer-readable media that may be implemented in accordance with the present disclosure.

(CRM1) At least one non-transitory computer-readable medium may be encoded with instructions which, when executed by at least one processor of a computing system, cause the computing system to receive at least first data indicative of a first event of a first system of record accessed using first access credentials associated with a user, to determine, based at least in part on first stored contextual data associated with the user, to create at least a first notification of the first event based at least in part on the first data, and to send the first notification to a client device operated by the user.

(CRM2) At least one non-transitory computer-readable medium may be configured as described in paragraph (CRM1), and may be encoded with additional instructions which, when executed by the at least one processor, further cause the computing system to retrieve the first data using the first access credentials and a first application programing interface (API) of the first system of record.

(CRM3) At least one non-transitory computer-readable medium may be configured as described in paragraph (CRM1) or paragraph (CRM2), and may be encoded with additional instructions which, when executed by the at least one processor, further cause the computing system to receive second data indicative of a second event of a second system of record accessed using second access credentials associated with the user, and to determine, based at least in part on the first stored contextual data, to refrain from creating a second notification of the second event based at least in part on the second data.

(CRM4) At least one non-transitory computer-readable medium may be configured as described in paragraph (CRM1) or paragraph (CRM2), and may be encoded with additional instructions which, when executed by the at least one processor, further cause the computing system to receive second data indicative of a second event of a second system of record accessed using second access credentials associated with the user, and to determine, based at least in part on the first stored contextual data, to delay creating a second notification of the second event based at least in part on the second data.

(CRM5) At least one non-transitory computer-readable medium may be configured as described in paragraph (CRM4), and may be encoded with additional instructions which, when executed by the at least one processor, further cause the computing system to determine, based at least in part on second stored contextual data associated with the user, a future time at which the computing system is to create the second notification, to create the second notification at the future time, and to send the second notification to the client device.

(CRM6) At least one non-transitory computer-readable medium may be configured as described in paragraph (CRM4) or paragraph (CRM5), and may be encoded with additional instructions which, when executed by the at least one processor, further cause the computing system to receive third data indicative of a third event of a third system of record accessed using third access credentials associated with the user, and to determine, based at least in part on the first stored contextual data, to refrain from creating a third notification of the third event based at least in part on the third data.

(CRM7) At least one non-transitory computer-readable medium may be configured as described in paragraph (CRM1) or paragraph (CRM2), and may be encoded with additional instructions which, when executed by the at least one processor, further cause the computing system to receive second data indicative of a second event of a second system of record accessed using second access credentials associated with the user, to determine, based at least in part on the first stored contextual data, to create a second notification of the second event based at least in part on the second data, to determine a first priority score for the first data, to determine a second priority score for the second data, and to determine, based at least in part on the first priority score and the second priority score, to create the first notification prior to creating the second notification.

(CRM8) At least one non-transitory computer-readable medium may be configured as described in paragraph (CRM7), and may be encoded with additional instructions which, when executed by the at least one processor, further cause the computing system to determine the first priority score and the second priority score based at least in part on third stored contextual data associated with the user.

(CRM9) At least one non-transitory computer-readable medium may be configured as described in any of paragraphs (CRM1) through (CRM8), and may be encoded with additional instructions which, when executed by the at least one processor, further cause the computing system to configure the first notification to include at least a first user interface element that can be selected to cause an action to be taken with respect to the first system of record, and to cause the action to be taken with respect to the first system of record in response to selection of the first user interface element.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
receiving, by a computing system, first data from a first system of record using first access credentials associated with a user and a first application programing interface (API) of the first system of record, the first data being indicative of a first event of the first system of record;
determining, by the computing system and based at least in part on first stored contextual data associated with the user, to create a first notification of the first event based at least in part on the first data;
receiving, by the computing system, second data from a second system of record using second access credentials associated with the user and a second API of the second system of record, the second data being indicative of a second event of the second system of record;
determining, by the computing system and based at least in part on the first stored contextual data, to create a second notification of the second event based at least in part on the second data;
determining, by the computing system, a first priority score for the first data;
determining, by the computing system, a second priority score for the second data;
determining, by the computing system and based at least in part on the first priority score and the second priority score, to create the first notification prior to creating the second notification; and
sending, by the computing system, the first notification to a client device operated by the user.

2. The method of claim 1, further comprising:
receiving, by the computing system, third data from a third system of record using third access credentials associated with the user and a third API of the third system of record, the third data being indicative of a third event of the third system of record; and
determining, by the computing system and based at least in part on the first stored contextual data, to refrain from creating a third notification of the third event based at least in part on the third data.

3. The method of claim 1, further comprising:
receiving, by the computing system, third data from a third system of record using third access credentials associated with the user and a third API of the third system of record, the third data being indicative of a third event of the third system of record; and
determining, by the computing system and based at least in part on the first stored contextual data, to delay creating a third notification of the third event based at least in part on the third data.

4. The method of claim 3, further comprising:
determining, by the computing system and based at least in part on second stored contextual data associated with the user, a future time at which the computing system is to create the third notification;
creating, by the computing system, the third notification at the future time; and sending, by the computing system, the third notification to the client device.

5. The method of claim 4, further comprising:
receiving, by the computing system, fourth data from a fourth system of record using fourth access credentials associated with the user and a fourth API of the fourth system of record, the fourth data being indicative of a fourth event of the fourth system of record; and
determining, by the computing system and based at least in part on the first stored contextual data, to refrain from creating a fourth notification of the fourth event based at least in part on the fourth data.

6. The method of claim 1, wherein:
the first priority score and the second priority score are determined based at least in part on second stored contextual data associated with the user.

7. The method of claim 1, further comprising:
configuring, by the computing system, the first notification to include at least a first user interface element that can be selected to cause an action to be taken with respect to the first system of record; and
causing, by the computing system, the action to be taken with respect to the first system of record in response to selection of the first user interface element.

8. A computing system, comprising:
at least one processor; and
at least one computer-readable medium encoded with instructions which, when executed by the at least one processor, cause the computing system to:
receive first data from a first system of record using first access credentials associated with a user and a first application programing interface (API) of the first system of record, the first data being indicative of a first event of the first system of record,
determine, based at least in part on first stored contextual data associated with the user, to create a first notification of the first event based at least in part on the first data,
receive second data from a second system of record using second access credentials associated with the user and a second API of the second system of record, the second data being indicative of a second event of the second system of record,
determine, based at least in part on the first stored contextual data, to create a second notification of the second event based at least in part on the second data,
determine a first priority score for the first data,
determine a second priority score for the second data,
determine, based at least in part on the first priority score and the second priority score, to create the first notification prior to creating the second notification, and
send the first notification to a client device operated by the user.

9. The computing system of claim 8, wherein the at least one computer-readable medium is further encoded with additional instructions which, when executed by the at least one processor, further cause the computing system to:
receive third data from a third system of record using third access credentials associated with the user and a third API of the third system of record, the third data being indicative of a third event of the third system of record; and
determine, based at least in part on the first stored contextual data, to refrain from creating a third notification of the third event based at least in part on the third data.

10. The computing system of claim 8, wherein the at least one computer-readable medium is further encoded with additional instructions which, when executed by the at least one processor, further cause the computing system to:
receive third data from a third system of record using third access credentials associated with the user and a third API of the third system of record, the third data being indicative of a third event of the third system of record; and
determine, based at least in part on the first stored contextual data, to delay creating a third notification of the third event based at least in part on the third data.

11. The computing system of claim 10, wherein the at least one computer-readable medium is further encoded with additional instructions which, when executed by the at least one processor, further cause the computing system to:
determine, based at least in part on second stored contextual data associated with the user, a future time at which the computing system is to create the third notification;
create the third notification at the future time; and
send the third notification to the client device.

12. The computing system of claim 11, wherein the at least one computer-readable medium is further encoded with additional instructions which, when executed by the at least one processor, further cause the computing system to:
receive fourth data from a fourth system of record using fourth access credentials associated with the user and a fourth API of the fourth system of record, the fourth data being indicative of a fourth event of the fourth system of record; and
determine, based at least in part on the first stored contextual data, to refrain from creating a fourth notification of the fourth event based at least in part on the fourth data.

13. The computing system of claim 8, wherein the at least one computer-readable medium is further encoded with additional instructions which, when executed by the at least one processor, further cause the computing system to:
determine the first priority score and the second priority score based at least in part on second stored contextual data associated with the user.

14. The computing system of claim 8, wherein the at least one computer-readable medium is further encoded with additional instructions which, when executed by the at least one processor, further cause the computing system to:
configure the first notification to include at least a first user interface element that can be selected to cause an action to be taken with respect to the first system of record; and
cause the action to be taken with respect to the first system of record in response to selection of the first user interface element.

15. At least one non-transitory computer-readable medium encoded with instructions which, when executed by at least one processor of a computing system, cause the computing system to:
receive first data from a first system of record using first access credentials associated with a user and a first application programing interface (API) of the first system of record, the first data being indicative of a first event of the first system of record;

determine, based at least in part on first stored contextual data associated with the user, to create a first notification of the first event based at least in part on the first data;

receive second data from a second system of record using second access credentials associated with the user and a second API of the second system of record, the second data being indicative of a second event of the second system of record;

determine, based at least in part on the first stored contextual data, to create a second notification of the second event based at least in part on the second data;

determine a first priority score for the first data;

determine a second priority score for the second data;

determine, based at least in part on the first priority score and the second priority score, to create the first notification prior to creating the second notification; and send the first notification to a client device operated by the user.

16. The at least one non-transitory computer-readable medium of claim 15, further encoded with additional instructions which, when executed by the at least one processor, further cause the computing system to:

receive third data from a third system of record using third access credentials associated with the user and a third API of the third system of record, the third data being indicative of a third event of the third system of record; and determine, based at least in part on the first stored contextual data, to delay creating a third notification of the third event based at least in part on the third data.

17. The at least one non-transitory computer-readable medium of claim 16, further encoded with additional instructions which, when executed by the at least one processor, further cause the computing system to:

determine, based at least in part on second stored contextual data associated with the user, a future time at which the computing system is to create the third notification;

create the third notification at the future time; and send the third notification to the client device.

18. The at least one non-transitory computer-readable medium of claim 15, further encoded with additional instructions which, when executed by the at least one processor, further cause the computing system to:

receive third data from a third system of record using third access credentials associated with the user and a third API of the third system of record, the third data being indicative of a third event of the third system of record; and determine, based at least in part on the first stored contextual data, to refrain from creating a third notification of the third event based at least in part on the third data.

19. The at least one non-transitory computer-readable medium of claim 15, further encoded with additional instructions which, when executed by the at least one processor, further cause the computing system to:

determine the first priority score and the second priority score based at least in part on second stored contextual data associated with the user.

20. The at least one non-transitory computer-readable medium of claim 15, further encoded with additional instructions which, when executed by the at least one processor, further cause the computing system to:

configure the first notification to include at least a first user interface element that can be selected to cause an action to be taken with respect to the first system of record; and cause the action to be taken with respect to the first system of record in response to selection of the first user interface element.

* * * * *